(12) United States Patent
Salutzki et al.

(10) Patent No.: US 9,045,926 B2
(45) Date of Patent: Jun. 2, 2015

(54) DOOR CLOSER HAVING A MAGNETIC DISTRIBUTION VALVE

(75) Inventors: Thomas Salutzki, Witten (DE); Volker Bienek, Dortmund (DE)

(73) Assignee: Dorme GmbH + Co. KG, Ennepetal (DE)

( * ) Notice: Subject to any disclaimer, the term of this patent is extended or adjusted under 35 U.S.C. 154(b) by 151 days.

(21) Appl. No.: 13/513,179

(22) PCT Filed: Nov. 30, 2010

(86) PCT No.: PCT/EP2010/007250
§ 371 (c)(1),
(2), (4) Date: May 31, 2012

(87) PCT Pub. No.: WO2011/066943
PCT Pub. Date: Jun. 9, 2011

(65) Prior Publication Data
US 2012/0233810 A1 Sep. 20, 2012

(30) Foreign Application Priority Data

Dec. 1, 2009 (DE) .......................... 10 2009 056 265

(51) Int. Cl.
*E05F 3/10* (2006.01)
*E05F 3/22* (2006.01)
*F16K 31/06* (2006.01)

(52) U.S. Cl.
CPC .............. *E05F 3/104* (2013.01); *Y10T 16/2793* (2015.01); *Y10T 16/2771* (2015.01); *Y10T 16/2796* (2015.01); *Y10T 16/56* (2015.01); *Y10T 16/593* (2015.01); *Y10T 16/2788* (2015.01); *Y10T 16/2766* (2015.01); *Y10T 16/2769* (2015.01); *Y10T 16/27* (2015.01); *Y10T 16/276* (2015.01); *E05F 3/223* (2013.01); *F16K 31/0627* (2013.01); *F16K 31/0693* (2013.01); *E05Y 2900/132* (2013.01)

(58) Field of Classification Search
CPC ........... E05F 15/04; E05F 15/02; E05F 15/18; E05F 3/10; E05F 3/104
USPC .............................................. 16/52, 53, 58, 49
See application file for complete search history.

(56) References Cited

U.S. PATENT DOCUMENTS

| | | | | |
|---|---|---|---|---|
| 1,888,712 | A | * | 11/1932 | Bouton ......................... 187/331 |
| 4,115,897 | A | * | 9/1978 | Zunkel .............................. 16/49 |
| 4,611,631 | A | * | 9/1986 | Kosugi et al. ............. 137/625.65 |
| 4,660,250 | A | * | 4/1987 | Tillman et al. .................... 16/58 |
| 7,003,847 | B2 | * | 2/2006 | Brown .............................. 16/53 |
| 7,966,771 | B2 | * | 6/2011 | Bienek ........................... 49/340 |

(Continued)

FOREIGN PATENT DOCUMENTS

| | | |
|---|---|---|
| DE | 34 23 242 | 11/1985 |
| DE | 102004061624 B3 * | 6/2006 |

(Continued)

*Primary Examiner* — Emily Morgan
(74) *Attorney, Agent, or Firm* — Cozen O'Connor

(57) ABSTRACT

A door closer, in particular a hinge door closer, including a locking function or free-swing function, having a door closer housing, an output shaft to be connected to a door, a piston assembly connected to the output shaft and guided in the door closer housing, a closer spring, a piston rod adapted to connect the piston assembly to the closer spring, a hydraulic lock compartment adapted to lock the closer spring, and solenoid control valve, in particular a 3/2-solenoid control valve. A closure damping compartment is formed between the door closer housing and the piston assembly on a side of the piston assembly facing away from the piston rod, and wherein the solenoid control valve controls at least the pressures in the closure damping compartment and in the lock compartment.

14 Claims, 15 Drawing Sheets

(56) References Cited

U.S. PATENT DOCUMENTS

| | | |
|---|---|---|
| 2008/0127562 A1* | 6/2008 | Bienek .............. 49/334 |
| 2011/0197391 A1* | 8/2011 | Yu et al. .............. 16/51 |
| 2012/0233810 A1* | 9/2012 | Salutzki et al. .......... 16/52 |
| 2012/0233811 A1* | 9/2012 | Salutzki et al. .......... 16/54 |
| 2012/0240351 A1* | 9/2012 | Bienek et al. .......... 16/72 |

FOREIGN PATENT DOCUMENTS

| | | | |
|---|---|---|---|
| DE | 102004061621 A1 * | 7/2006 | |
| DE | 102004061630 A1 * | 7/2006 | |
| DE | 10 2005 047339 | 1/2007 | |
| DE | 102010022049 A1 * | 6/2011 | |
| DE | 102010022053 A1 * | 6/2011 | |
| DE | 102004061619 C5 * | 9/2011 | |
| EP | 1672158 A1 * | 6/2006 | |
| EP | 2088271 A2 * | 8/2009 | |
| WO | WO 2006/066663 | 6/2006 | |
| WO | WO 2006066663 A1 * | 6/2006 | ........ E05F 3/10 |
| WO | WO 2006066666 A1 * | 6/2006 | ........ E05F 3/10 |
| WO | WO 2006066667 A1 * | 6/2006 | ........ E05F 3/10 |

\* cited by examiner

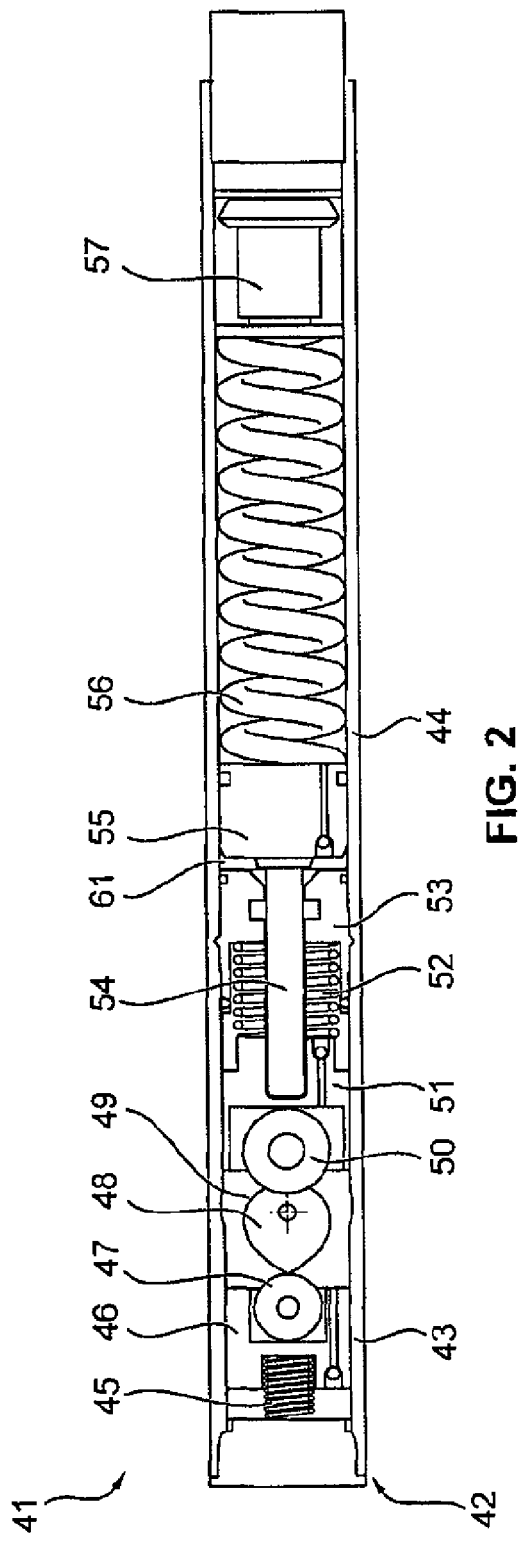
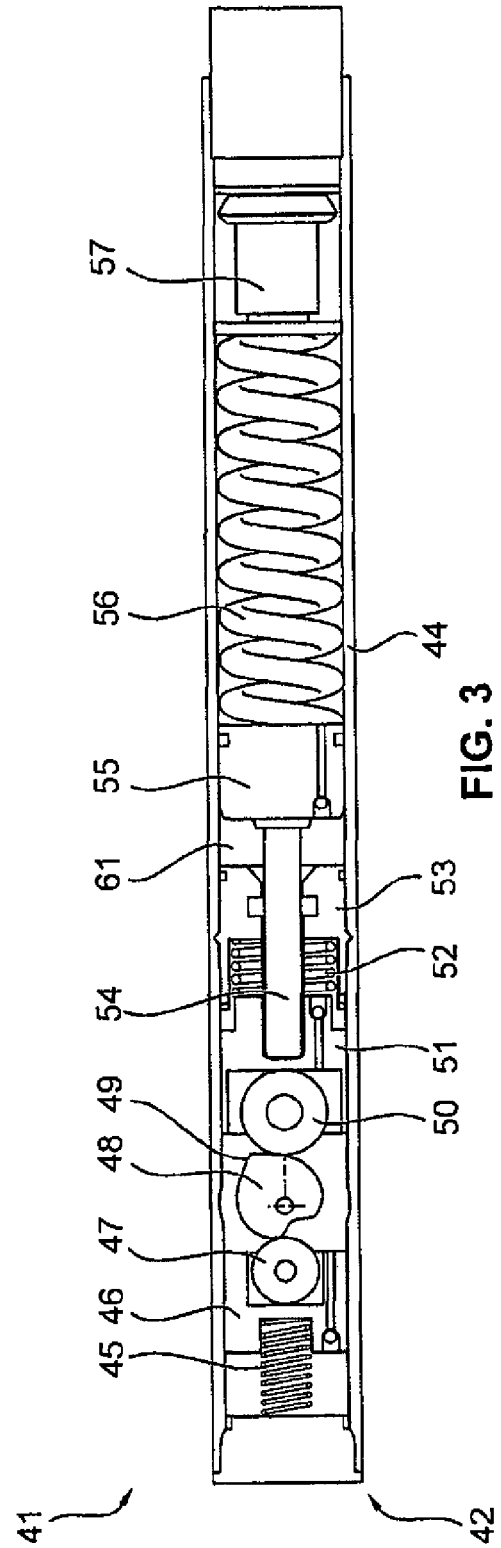

DOOR CLOSER HAVING A MAGNETIC DISTRIBUTION VALVE

CROSS REFERENCE TO RELATED APPLICATIONS

This is a U.S. national stage of application No. PCT/EP2010/007250, filed on 30 Nov. 2010. Priority is claimed on German Application No. 10 2009 056 265.6 filed 1 Dec. 2009 and German Application No. 10 2010 013 853.3 filed 1 Apr. 2010, the contents of which are incorporated here by reference.

BACKGROUND OF THE INVENTION

1. Field of the Invention

The invention relates to a door closer including a solenoid control valve.

2. Description of Prior Art

In the state of the art, a differentiation is made between door closers and door drives. In case of door closers, the door has to be opened manually by a person. During the opening process, energy is stored, e.g. in a closer spring, and the door closer is capable to close the door by using the stored energy. The door drive is an assembly that automatically opens and closes the door by an additional auxiliary energy, e.g. by a motor or hydraulics. In particular when considering the hydraulic circuits in door drives and door closers, significant differences can be found. In electro-mechanic door drives, a motor and a pump are always provided, which apply the required hydraulic pressure. The respective pressure chambers are thereby actively charged with hydraulic pressure, such that the opening of the door is effected. Thus, in the door drive, the pressure is generated by the internal components, i.e. motor and pump. In contrast, the pressure chambers in a door closer are filled by expansion of the chambers and by suctioning the hydraulic oil from other spaces of the door closer. Herein, the energy for the closer spring and for the pressure generation is supplied into the door closer by opening the door. Consequently, the force and moment characteristics as well as the occurring loads are mostly different for a door closer and a door drive. The door drive has to apply the energy for accelerating the door in an opening direction additionally, whereas, in case of the door closer, the door is accelerated in an opening direction by the user.

SUMMARY OF THE INVENTION

One embodiment of the present invention provides a door closer that has a very slender structure while being manufactured at low costs, and which is consequently also applicable as an integrated door closer, e.g. in a door frame or a door. In addition, the door closer is configured to include a locking function or a free-swing-function.

According to one embodiment, a door closer, in particular a hinge door closer, includes a locking function or free-swing-function, and comprises a door closer housing, an output shaft to be connected to a door, a piston assembly connected to the output shaft and guided in the door closer housing, a closer spring, a piston rod adapted to connect the piston assembly to the closer spring, and a hydraulic lock compartment adapted to lock the closer spring. Further, the door closer comprises a solenoid control valve, in particular a 3/2-solenoid control valve, wherein a closure damping compartment is formed between the door closer housing and the piston assembly on a side of the piston assembly facing away from the piston rod, in particular on the side of a damper piston. According to the invention, the solenoid control valve controls at least the pressures in the closure damping compartment and in the lock compartment.

Preferably, the door closer comprises, for providing the free-swing-function, a free-swing-assembly adapted to enable a translational motion of the piston assembly decoupled from the closer spring when the closer spring is locked. In an alternative locking function, the closer spring is fixedly connected to the piston assembly, such that the piston assembly and therewith the door are arrested simultaneously by the locking of the closer spring.

The solenoid control valve hydraulically seals the lock compartment. Therewith, the closer spring, once biased, can no longer relax and the free-swing-function of the door closer is activated. By switching the solenoid control valve, the lock compartment is pressure-released and the closer spring can dislocate the piston assembly and therewith close the door through the output shaft, e.g. in case of a fire.

Preferably, the door closer including a free-swing-function is used in facilities for handicapped persons, apartments for senior citizens or nursery schools as well as for safeguarding fire protection doors. In combination with a fire alarm system, the closing of said doors is secured for avoiding a propagation of smoke and fire, without exposing the users of the door to a constant opening moment of prior art door closers. In particular in case of fire protection doors, very strong closer springs have to be used, such that a safe closing of the door can be guaranteed also in case of an air draft in the corridors. The tensioning of such closer springs whenever the door is opened cannot be expected from children, ill persons or senior citizens. In this case, the free-swing-function enables that the closer spring is biased only once and remains biased until a possible emergency case. The present door closer can be inserted invisibly into the door leaf or in the door frame due to its very slender overall width, such that no optical drawback occurs and it is protected against demolition by vandalism.

Preferably, the door closer comprises a fluid-tight separating wall arranged in the door closer housing between the piston assembly and the closer spring, wherein the piston rod passes through the separating wall in a fluid-tight manner. The separating wall is sealed and stationary with respect to the door closer housing. A slide ring seal is preferably used between the piston rod and the separating wall.

Further, the door closer advantageously comprises a closer spring tension piston guided in the door closer housing and abutting on the closer spring. The piston rod therefore transmits the force from the piston assembly to the closer spring tension piston. The closer spring abuts on the closer spring tension piston.

Preferably, the lock compartment is formed between the separating wall and the closer spring tension piston. On one side of the separating wall, the piston assembly including the output shaft is arranged. The piston rod transmits the forces through the separating wall to the other side. On this other side, the lock compartment, the closer spring tension piston and the closer spring are arranged.

For the free-swing-function included in the door closer mechanism, the closer spring, also referred to as energy storing spring, must be retained in a biased position by means of the hydraulic lock compartment, in order to prevent an immediate closing of the door after the manual opening thereof. Since the effective direction of the closer spring is directed to the output shaft via the piston assembly, the additional closer spring tension piston is preferably used, which piston acts on the piston assembly via the piston rod. In combination with the piston rod and the separating wall, the hydraulic lock compartment for hydraulically arresting the closer spring is thus generated. The piston rod extends through the lock compartment, such that the lock compartment may also be referred to as ring space. Based on this structure of the inventive door closer, a decisive difference between the known door drives and the door closer proposed herein can be well explained. In the known door drive, an oil volume actively pressurized by a hydraulic pump is pumped into the pressure chambers, and therewith an energy saving spring is biased through a spring tension piston. Contrary thereto, the proposed door closer provides that the oil volume corresponding to the stroke is displaced from other housing areas into the lock compartment during the manual opening process, and the discharge from the lock compartment is e.g. blocked by a solenoid valve. Thus, in the door closer proposed herein, the stored force of the closer spring is absorbed by the oil pressure and cannot introduce a torque to the output shaft via the piston assembly.

Preferably, it is provided that the free-swing assembly is formed as a sliding-coupling that exclusively transmits compressive forces between the closer spring and the piston assembly. For the free-swing-function, no fixed connection may exist between the closer spring and the piston assembly. Therefore, a sliding connection is preferably used, which exclusively transmits compressive forces.

In a preferred embodiment, it is provided that a first hydraulic line, in particular a pressure line P, extends from the lock compartment to the solenoid control valve, a second hydraulic line, in particular an operating line A, extends from the closure damping compartment to the solenoid control valve, and a third hydraulic line, in particular a tank line T, extends from the solenoid control valve to a tank compartment. The hydraulic lines preferably extend substantially in parallel with the longitudinal door closer axis and are integrated into the housing of the door closer.

In a preferred embodiment, an opening damping compartment is formed between the piston assembly and the separating wall and/or between the piston assembly and the additional piston. A first throttled connection is disposed between the opening damping compartment and the tank compartment. The additional piston may be open-worked and does not have to be guided sealingly in the door closer housing, such that the opening damping compartment extends to the areas between the piston assembly and the additional piston and between the additional piston and the separating wall. Upon opening the door, the piston assembly dislocates the hydraulic oil from the opening damping compartment. The hydraulic oil flows through the first throttled connection, and in particular through the third line, into the tank compartment.

In a preferred embodiment of the opening damping compartment, a first unthrottled connection is arranged between the opening damping compartment and the tank compartment, wherein the first throttled connection is always open and the first unthrottled connection is either closed or opened by the piston assembly, depending on the position of the piston assembly. The first unthrottled connection preferably enters into the opening damping compartment between the first throttled connection and the output shaft. Therewith, the hydraulic oil can be discharged through the first unthrottled connection into the tank compartment at the beginning of the opening process of the door. Consequently, the door can be opened very easily and without any resistance at the beginning of the opening process. When a specific opening angle is reached, the piston assembly, in particular the opening piston, closes the first unthrottled connection. Consequently, the hydraulic oil can only be discharged through the first throttled connection into the tank compartment and the door is damped shortly before it reaches its final position during opening.

Preferably, the door closer comprises a further throttled connection which is arranged between the closure damping compartment and the tank compartment, in particular in the third line. Said further throttled connection serves for dampening the door in the closing direction.

In a preferred embodiment, the solenoid control valve connects the first line to the third line and blocks the second line in a first switching position; in a second switching position, the second line is connected to the third line and the first line is blocked.

Therewith, the pressure line P and thus the lock compartment are connected to the tank line T in the first switching position. The operating line A and thus the closure damping compartment are blocked. In this switching position, the closer spring or the closer spring tension piston, respectively, are not locked and the free-swing-function is deactivated. By blocking the operating line A, the hydraulic oil can be discharged from the closure damping compartment into the tank compartment only through the further throttled connection and the closing process of the door is therewith always damped. In the second switching position, the pressure line P of the lock compartment is blocked and the operating line A of the closure damping compartment is connected to the tank line. Therewith, the closure spring is hydraulically arrested and the free-swing-function is activated. In this switching position, the closure spring cannot transmit any force to the piston assembly. Simultaneously, the closer dampening is deactivated and the piston assembly is freely movable and the door can be moved without a large effort. This embodiment of the hydraulic control is the preferred embodiment.

In an alternative hydraulic control, it is provided that the solenoid valve connects the first line to the second line in a first switching position, and connects the second line to the third line and blocks the first line in a second switching position. Consequently, in the first switching position, the pressure line P of the lock compartment is connected to the operating line A of the closure damping compartment. In said switching position, the closer spring relaxes and dislocates the hydraulic oil from the lock compartment. With the first switching position, the lock compartment is set to the same pressure level as the closure damping compartment. Due to this addition of the dislocated oil volumes, a very fail-safe regulation of the closing speed can be achieved. The oil of both spaces, i.e. the lock compartment and the closure damping compartment, together flow into the tank compartment through the further throttled connection of the closure damping compartment. In the second switching position, the pressure line P of the lock compartment is blocked, such that the free-swing-function is again activated. The operating line A of the closure damping compartment is connected to the tank line, such that the closure damping during free-swing is deactivated.

In a preferred embodiment, it is provided that the solenoid valve releases the closer spring when de-energized and enables the free-swing-function when energized. With this deenergize-to-trip-principle, it is guaranteed that the door closes by means of the energy stored in the closer spring in case of a power breakdown.

BRIEF DESCRIPTION OF THE DRAWINGS

In the following, the invention is explained in more detail on the basis of the accompanying drawing, in which:

FIG. 2 is an inventive door closer with closed door at an opening angle of 0° with inactive free-swing for all embodiments;

FIG. 3 is an inventive door closer with opened door at an opening angle of 150° with inactive free-swing for all embodiments;

DETAILED DESCRIPTION OF THE PREFERRED EMBODIMENTS

Figure 1:
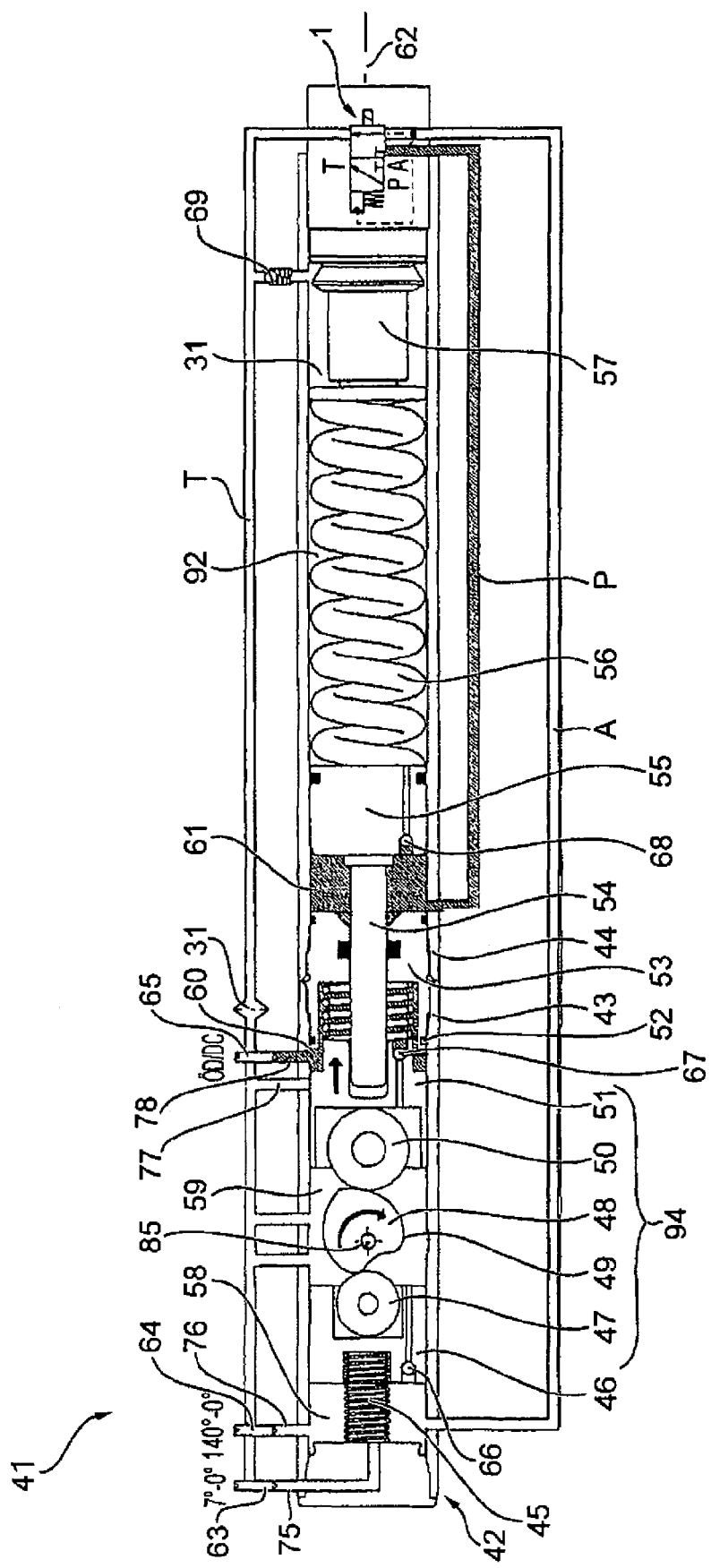
FIG. 1 is an inventive door closer according to a first embodiment.

In the following, the basic structure as well as the hydraulic control and the function of a door closer 41 according to the first embodiment is explained with reference to FIG. 1.

The door closer 41 extends along a longitudinal door closer axis 62. The door closer 41 comprises a door closer housing 42, which in turn consists of a first door closer housing part 43 and a second door closer housing part 44. In FIG. 1, the various hydraulic lines are shown to be outside the door closer housing 42. This illustration, however, is only given for facility of inspection. In practice, the hydraulic lines are integrated into the door closer housing 42. In the following, the structure of the door closer 41 along its longitudinal door closer axis 62 is explained from left to right. A first pressure spring 45 is supported against the door closer housing 42, in particular against a front face of the first door closer housing part 43. The first pressure spring 45 pushes a piston assembly 94. This piston assembly 94 is guided in the door closer housing 42, in particular in the first door closer housing part 43. Opposite to the first pressure spring 45, a second pressure spring 52 abuts against the piston assembly 94. Said second pressure spring 52 is supported against a separating wall 53, in particular a housing separating wall. The separating wall 53 is disposed at the sectional area between the first door closer housing part 43 and the second door closer housing part 44. The separating wall 53 forms a flange for connecting the two housing parts 43, 44 and simultaneously seals the two housing parts 43, 44 against each other. A piston rod 54 passes through the separating wall 53 along the longitudinal door closer axis 62. The piston rod 54 is sealingly guided in the separating wall 53, in particular by a slide ring seal. The piston rod 54 is fixedly connected to a closer spring tension piston 55. Said closer spring tension piston 55 is guided in the door closer housing 42, in particular in the second door closer housing part 44. The closer spring tension piston 55 is followed by a closer spring 56. The closer spring 56 is supported against the closer spring tension piston 55 on one side and against an adjusting unit 57 for the closer spring biasing on the other side. Adjacent to the adjusting unit 57 for the closer spring biasing, a 3/2-solenoid control valve 1, in the embodiment of a cartridge valve, is disposed and integrated into the door closer housing 42, in particular in the second door closer housing part 44.

The piston assembly 94 comprises, on a side thereof facing the first pressure spring 45, a damper piston 46, and an opening piston 47 on the side facing the piston rod 54. The damper piston 46 comprises a first cam roller 47, which is rotatably supported therein. The opening piston 51 comprises a second cam roller 50 supported rotatably therein. An output shaft 48, in the embodiment of a cam shaft, is arranged between the first cam roller 47 and the second cam roller 50. The output shaft 48 extends along an output axis 85 perpendicular to the longitudinal door closer axis 62. Said output shaft 48 transmits the force from the piston assembly 94 though an arrangement of levers or an arrangement with slide rails to the door as well as from the door to the piston assembly 94. For this purpose, the output shaft 48 comprises a cam-shaped rolling contour 49.

The first cam roller 47 and the second cam roller 50 roll on this rolling contour 49. The rolling contour 49 is heart-shaped, as shown at least in FIG. 1.

The damper piston 46, the opening piston 51 and the closer spring tension piston 55 are sealingly guided within the door closer housing 42 and, for this purpose, preferably comprise seals or sealing flanges at their circumference. Due to this sealed guiding of the pistons, different spaces or chambers are generated in the door closer housing 42, which are connected to each other via various hydraulic lines. Said chambers or spaces are, according to the structure shown in FIG. 1, again explained from left to right along the longitudinal door closer axis 62. A closure damping compartment 58 is formed, defined by the left end face of the door closer housing 42, in particular the first door closer housing part 43, and the damper piston 46. A piston assembly inner space 59 is disposed between the damper piston 46 and the opening piston 51. Same can also be referred to as cam shaft space. The piston assembly inner space 59 is on both sides sealed by the damper piston 46 and the opening piston 51 and is always maintained at a tank pressure level. An opening damping compartment 60 is disposed between the opening piston 51 and the separating wall 53. On the other side of the separating wall 53, the lock compartment 61 is arranged between the separating wall 53 and the closer spring tension piston 55. The lock compartment 61 is defined by the separating wall 53, the wall of the second door closer housing part 44 and the closer spring tension piston 55. In addition, the door closer 41 comprises a tank compartment 31. The tank compartment 31 is arranged between the closure spring tension piston 55 and the solenoid control valve 1 and accommodates the closer spring 56 and the adjusting unit 57. Based on FIGS. 11 to 18, the specific design of the solenoid control valve 1 is explained later on. In this context, also the specific constructive design of a preferred tank compartment 31 will be explained. In particular, also a closer spring accommodating space 92 and/or the piston assembly inner space 59 can be used as a tank by means of unthrottled connections to the tank compartment 31.

In addition, the door closer 41 comprises a first hydraulic line, embodied as pressure line P, a second hydraulic line, embodied as operating line A, and a third hydraulic line, embodied as tank line T. The three hydraulic lines extend in parallel with the longitudinal door closer axis 62 in the door closer housing 42. The three hydraulic lines are connected to the various chambers or spaces in the door closer 41 through short channels which extend radially/vertically with respect to the longitudinal door closer axis 62. FIG. 1 shows the hydraulic lines only schematically. In practice, the hydraulic lines are integrated into the door closer housing 42. The pressure line P extends from the lock compartment 61 to the solenoid control valve 1 directly and without being throttled. The operating line A extends from the closure damper space 58 to the solenoid control valve 1 directly and without being throttled. The solenoid control valve 1 is further connected to the tank line T. The designation "direct and without being throttled" means that no separate throttles are provided in the lines. Nevertheless, the pressure can be slightly throttled by possible filters or dynamic pressure differences.

The opening damping compartment 60 is connected to the tank line T through a first throttled connection 78. For this purpose, a first throttle valve 65 is used. In addition, a first unthrottled connection 77 exists between the opening damping compartment 60 and the tank line T. The opening of the opening damping compartment 60 into the first unthrottled connection 77 lies nearer to the output shaft 48 than the opening of the opening damping compartment 60 into the first throttled connection 78. Therewith, the unthrottled connection 77 can be closed by the opening piston 51 when a specific opening angle of the door is reached.

The closure damping compartment 58 is connected to the tank line T through a second throttled connection 75 which is arranged at the front face of the first door closer housing part 43. For this purpose, a second throttle valve 63 is used. In addition, a third throttled connection 76 is provided in the circumferential surface of the door closer housing 42 between the closure damping compartment 58 and the tank line T, including a third throttle valve 64. The piston assembly inner space 59 is connected to the tank line T in an unthrottled manner by at least one radial channel. A filter 31 is depicted in the tank line T. Herein, the position of the filter 31 is only exemplary. For example, the filter 31 can also be integrated into the solenoid valve 1. Preferably, further filters 31 can be arranged in the other hydraulic lines.

In the damper piston 46, a first check valve 66 is installed. This check valve locks toward the piston assembly inner space 59. A second check valve 67 is installed in the closer piston 51. Same also locks toward the piston assembly inner space 59. A third check valve 68 is provided in the closer spring tension piston 55. This check valve enables a hydraulic flow toward the lock compartment 61 and a locking toward the tank compartment 31. A forth check valve 69 is provided between the tank compartment 31 and the tank line T. Said check valve is spring-loaded and locks toward the tank line T. With the first, second and third check valves 66, 67 and 68, the closure damping compartment 58, the opening damping compartment 60 and the lock compartment 61 can always be filled with hydraulic oil from the tank volume upon expansion.

Figure 4:
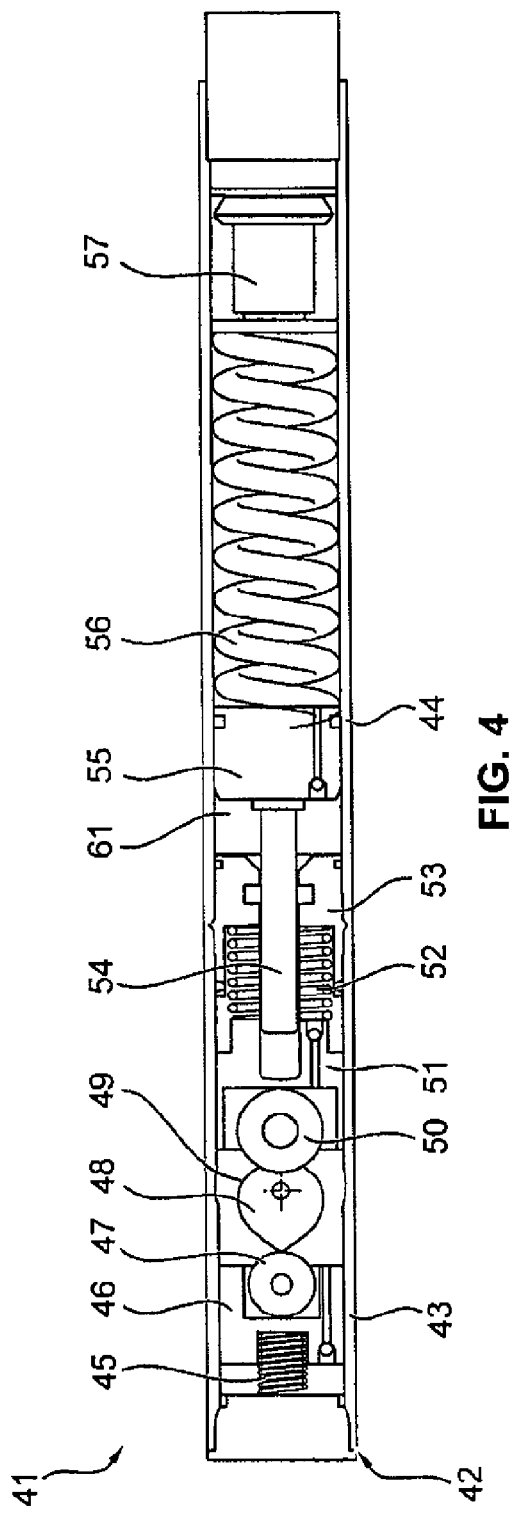
FIG. 4 is an inventive door closer with closed door at an opening angle of 0° with activated free-swing for all embodiments.
Figure 5:
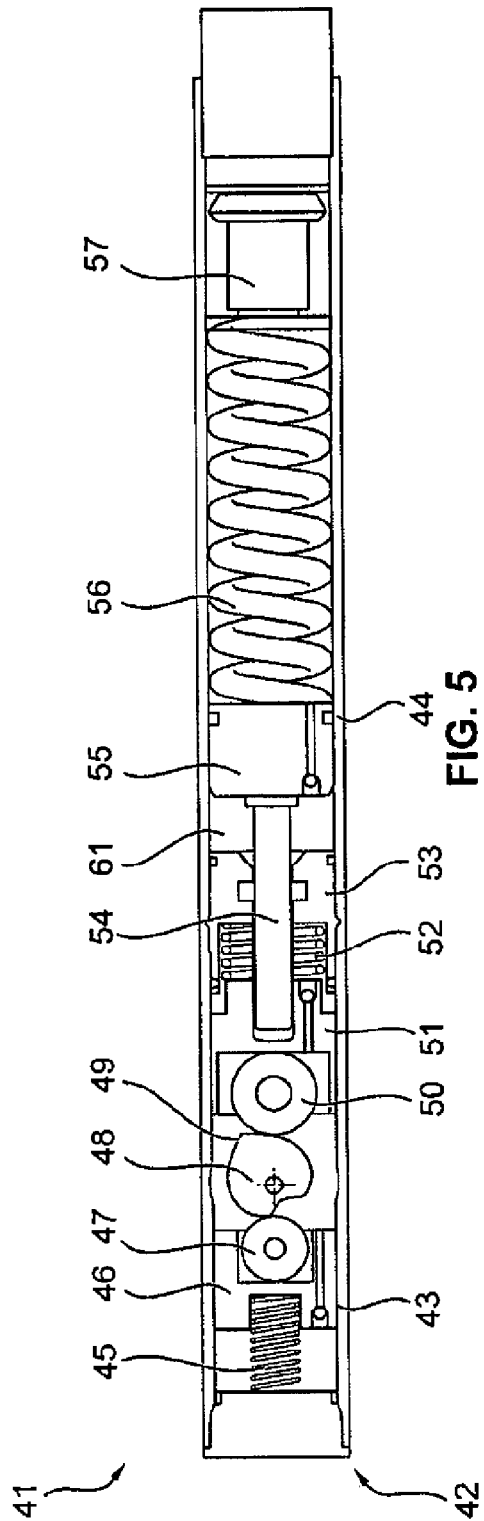
FIG. 5 is an inventive door closer during the opening process with activated free-swing for all embodiments.

An free-swing assembly is formed between the piston rod 54 and the opening piston 51. The constructive design of this free-swing assembly is explained in more detail in FIG. 6. At first, however, the functions and motions of the door closer 41 are explained in more detail with reference to FIGS. 2 to 5. The functions and motions of the door closer 41 according to FIGS. 2 to 5 are applicable for all embodiments proposed herein. FIG. 2 shows the door closer 41 at an angle position of 0° with a released closer spring. FIG. 2 therewith shows the starting position of the door closer 41. FIG. 3 shows the door closer during opening at an angle position of 150° of the output shaft 48. The door is opened by a person. Due to this, the output shaft 48, which is connected to the door frame via an arrangement of levers, rotates. The force is transmitted through the rolling contour 49 to the cam rollers 47, 50. This results in a translational motion of the piston assembly 94 to the right. Together with the piston assembly 94, also the piston rod 54 and therewith the closer spring tension piston 55 are moved to the right. Consequently, the closer spring 56 is biased. During this opening process, the pressure line P is closed by means of the solenoid control valve 1. Hydraulic liquid is pushed through the third check valve 68 into the lock compartment 61. The opening process shown in FIG. 3 serves to tension the closer spring 56. After tensioning the closer spring 56 and by keeping the pressure line P closed, the free-swing-function of the door closer 41 is active. FIG. 4 shows the door closer 41 again in a closed position with a door angle of 0°. As is easily discernible, the closer spring 56 remains in the tensioned position, since the lock compartment 61 is still filled with hydraulic oil. Together with the closer spring tension piston 55, also the piston rod 54 remains unmovable. Due to the free-swing assembly, the piston assembly 94 lifts off the piston rod 54 through the backturn of the output shaft 48 upon a closing motion operated manually at the door. Herein, the piston assembly 94 can freely move together with the door. Merely a slight force is transmitted through the two pressure springs 45, 52 to the piston assembly 94, such that a constant and clearance-free contact of the piston assembly 94 to the output shaft 48 and the cam contour 49, respectively, is secured by the cam rollers 47 and 50. As shown in FIG. 5, the closer spring 56 remains in its tensioned and arrested position during the free-swing-function. Meanwhile, the door is freely movable without any torque.

Figure 6:
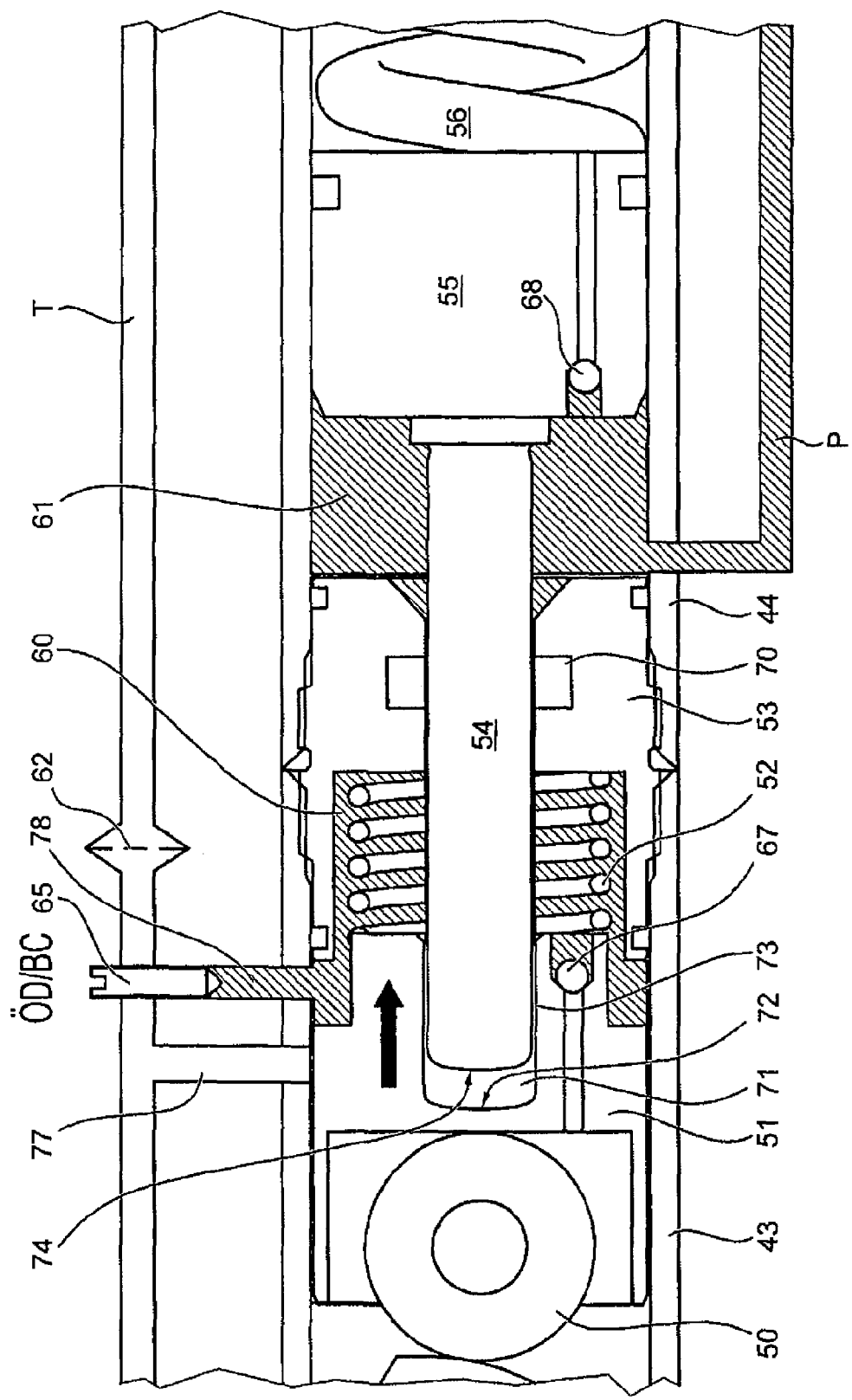
FIG. 6 is a detailed view of the free-swing according to the first embodiment.

FIG. 6 shows a detailed view of the free-swing according to the first embodiment. The free-swing assembly is here embodied as a sliding-coupling. The two essential components of this free-swing assembly are the first front face 74 and the second front face 72. The first front face 74 is parallel to the second front face 72. Both front faces 74, 72 are positioned vertically with respect to the longitudinal door closer axis 62. The first front face 74 is a front face of the piston rod 54. The second front face 72 is located at the piston assembly 94, in particular at the opening piston 51. In the embodiment shown in FIG. 6, a pocket 71 is included in the opening piston 51. A part of the piston rod 54 engages with this pocket 71 and is guided therein along the piston guide 73. The second front face 72 is formed as a bottom of the pocket 71. The two front faces 74, 72 are thus arranged opposite to each other in the pocket 71 and can mutually lift off in case of a free-swing.

Figure 7:
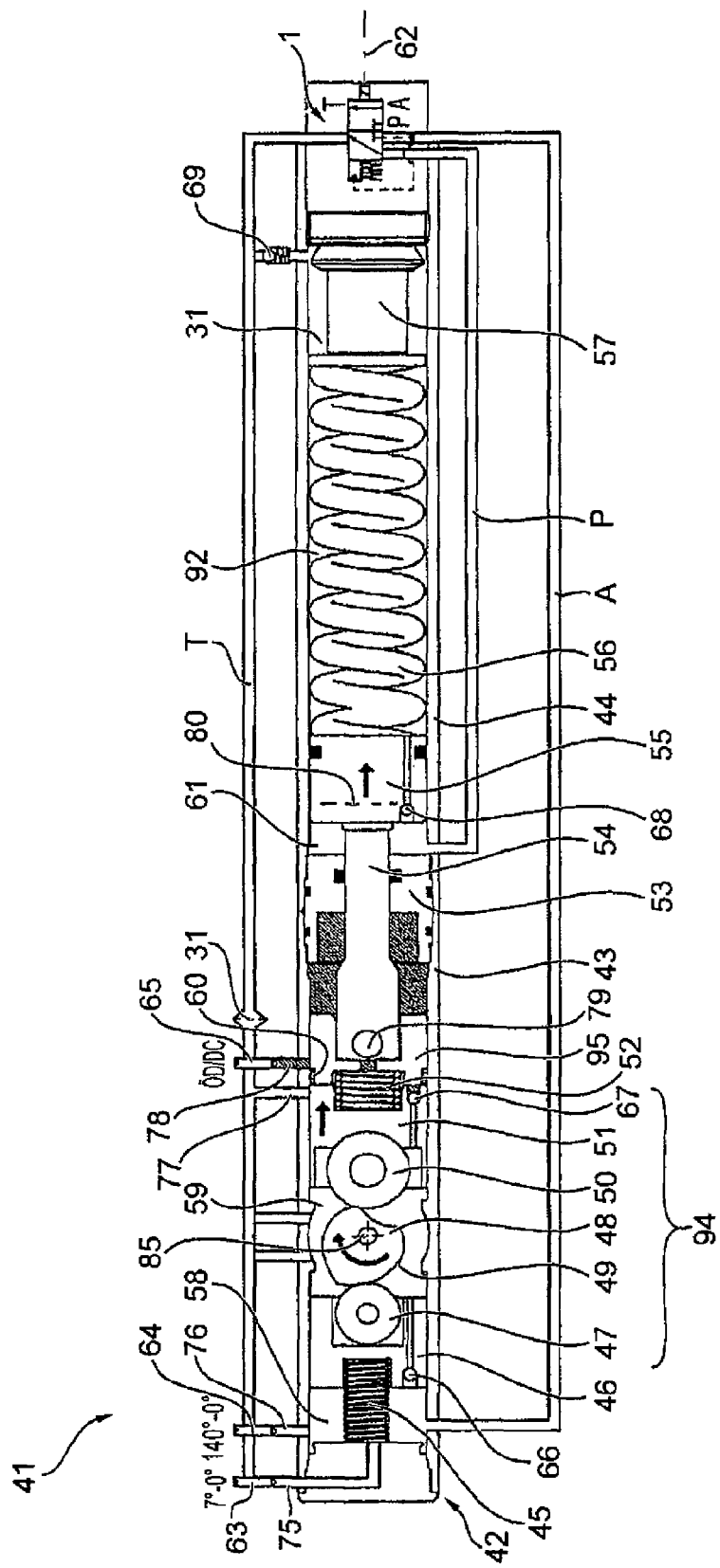
FIG. 7 is an inventive door closer according to a second embodiment with an inactive free-swing.
Figure 8:
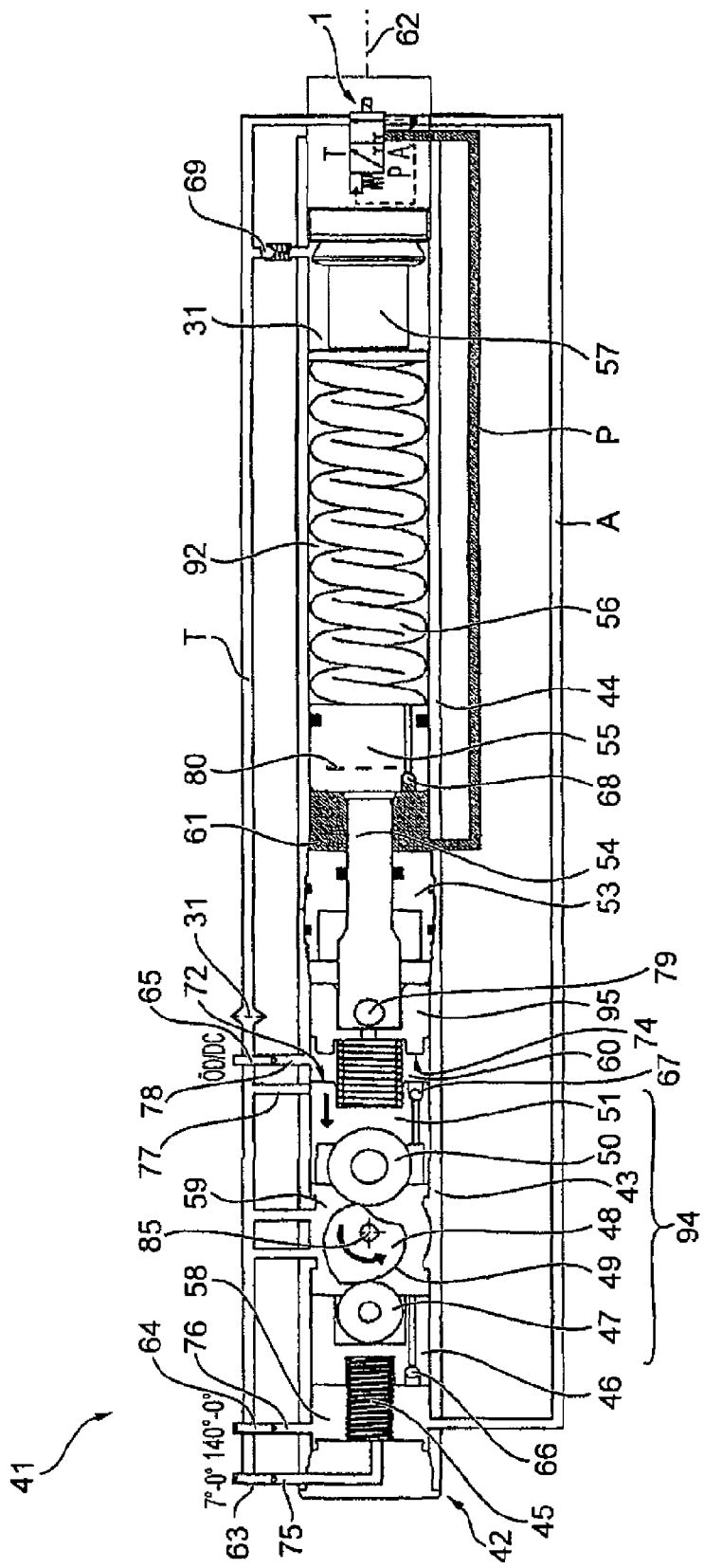
FIG. 8 is the inventive door closer according to the second embodiment with activated free-swing.

FIGS. 7 and 8 show a door closer 41 according to a second embodiment. Identical components or components identical in function are designated with identical reference numerals in all embodiments. FIG. 7 shows a door closer 41 during biasing of the closer spring 56. In FIG. 8, the lock compartment 61 is hydraulically blocked through the pressure line P. Consequently, the closer spring tension piston 55 and the closer spring 56 remain in their tensed positions. The piston assembly 94 and the door are freely swingable.

Apart from the difference described in the following, the second embodiment corresponds to the first embodiment: Contrary to the first embodiment, an additional piston 95 is arranged between the separating wall 53 and the piston assembly 94, in particular the opening piston 51, in the second embodiment. The additional piston 95 is fixedly connected to the piston rod 54 for transmitting a translational motion. The first front face 74 is formed frontally at the additional piston 95. The additional piston 95 comprises a passage, such that the area between the additional piston 95 and the piston assembly 94 as well as the area between the additional piston 95 and the separating wall 53 form the opening damping compartment 60. A further difference between the first embodiment and the second embodiment is that, in the second embodiment, the piston rod 54 is connected pivotally to the additional piston 95 and the closer spring tension piston 55. The connection between the piston rod 54 and the additional piston 95 is pivotal about a first axis 79. The connection between the piston rod 54 and the closer spring tension piston 55 is pivotal about a second axis 80. Both axes 79, 80 are positioned vertically with respect to the longitudinal door closer axis 62. In addition, the first axis 79 is positioned vertically with respect to the second axis 80. Further, the axis 80 is positioned vertically with respect to the longitudinal door closer axis 62. Said pivotal connection of the piston rod 54 prevents a seizing of the assembly in case forces occur, which do not extend in parallel with the longitudinal door closer axis 62.

Figure 9:
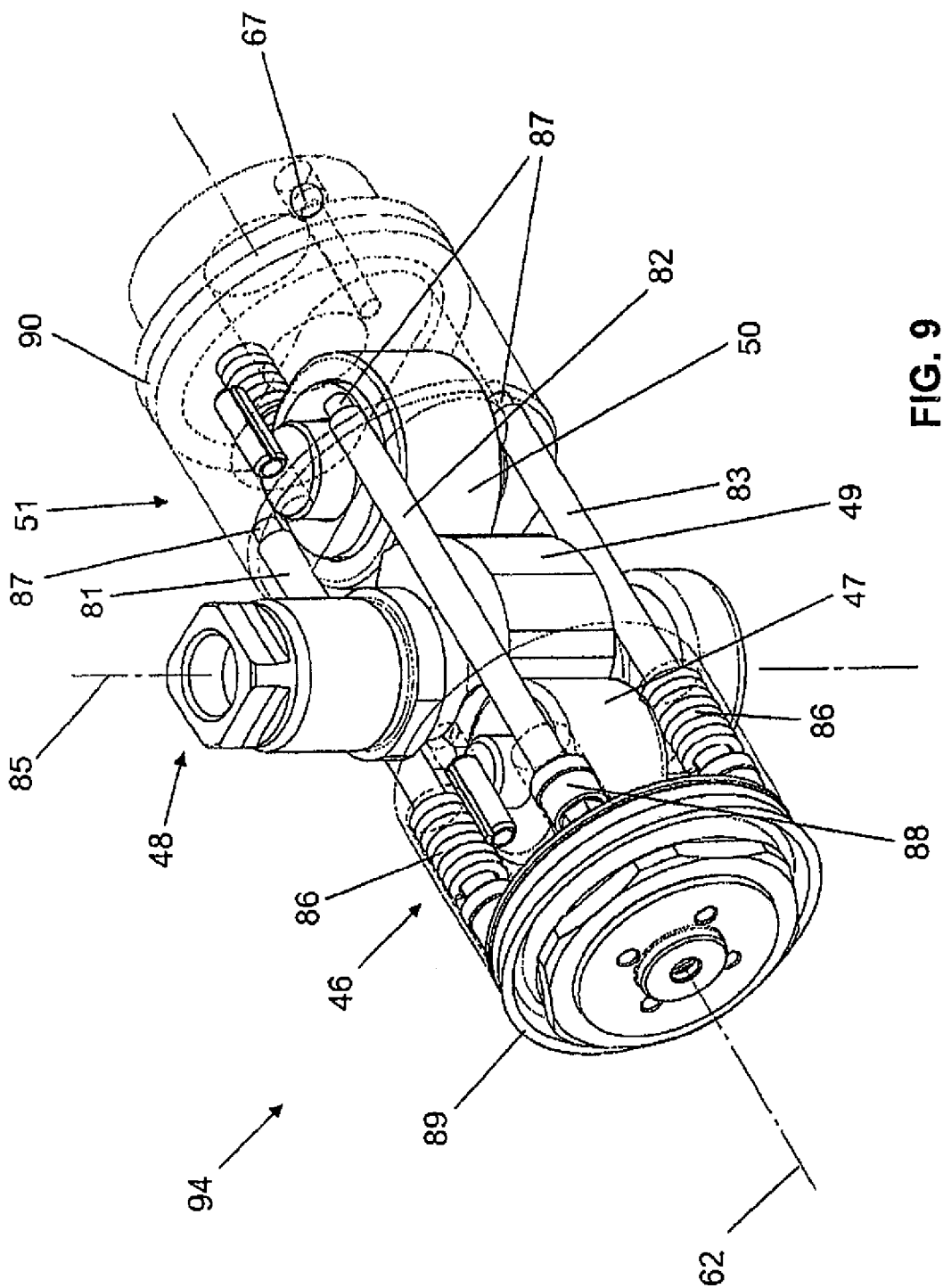
FIG. 9 is a piston assembly of an inventive door closer according to a third embodiment.
Figure 10:
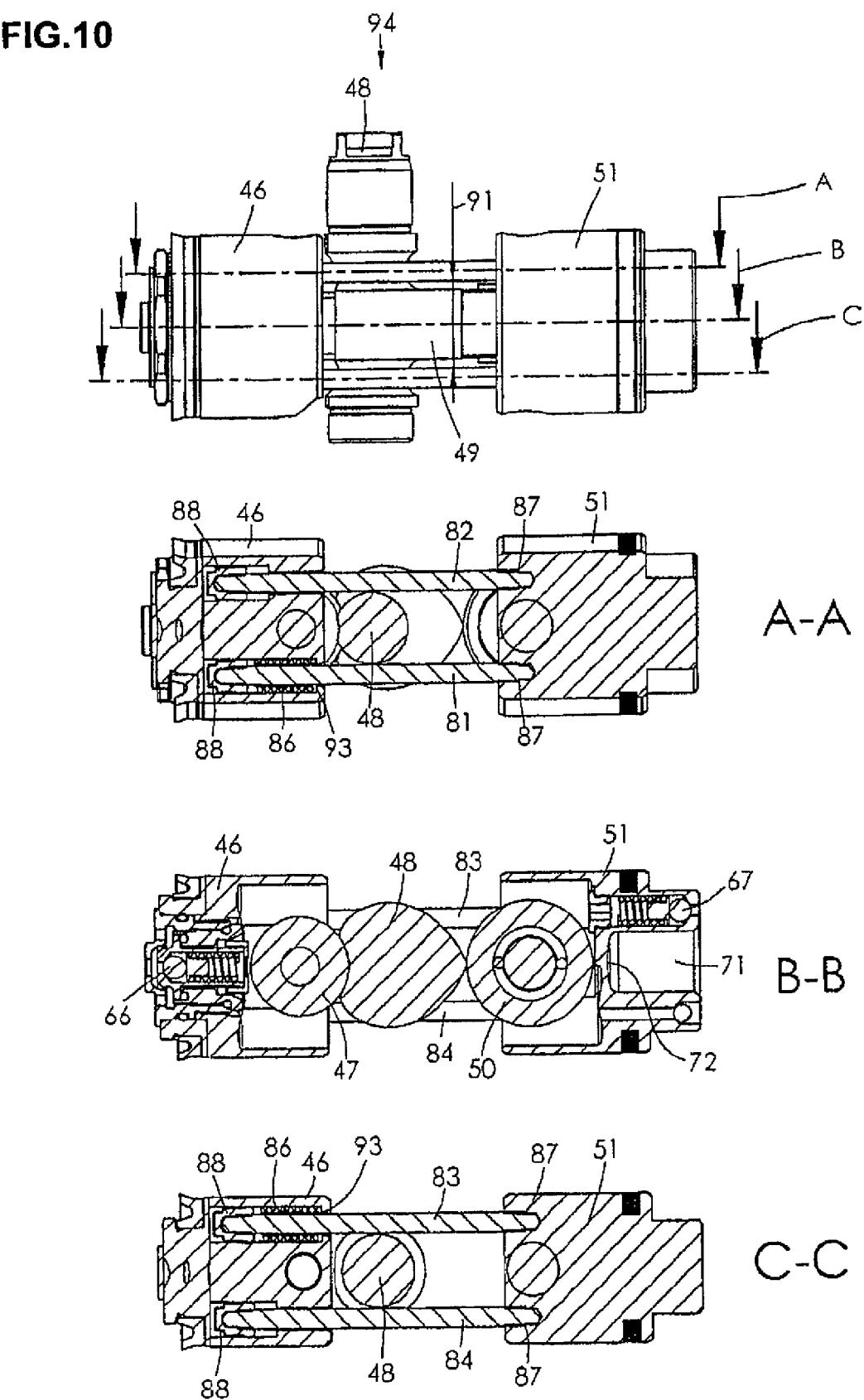
FIG. 10 are different sectional views of the piston assembly according to the third embodiment.

FIGS. 9 and 10 show a piston assembly 94 of the door closer 41 according to a third embodiment. Identical components or components identical in function are designated with identical reference numerals in all embodiments. The piston assembly 94 of the third embodiment can preferably be used in the door closers 41 according to all embodiments proposed herein.

The piston assembly 94 proposed in FIGS. 9 and 10 replaces the piston assembly 94 of FIGS. 1 to 7, in particular the damper piston 46 including the first cam disc 47 and the opening piston 51 including the second cam disc 50. The output shaft 48 remains unchanged. Due to the use of the piston assembly 94 according to the third embodiment, the first pressure spring 45 and the second pressure spring 52 are not longer required, however, can be used in addition.

FIG. 9 shows the piston assembly 94, wherein the damper piston 46 and the opening piston 51 are connected by a first tie rod 81, a second tie rod 82, a third tie rod 83 and a forth tie rod 84. The four tie rods 81 to 84 are arranged in parallel with the longitudinal door closer axis 62. In addition, the four tie rods 81 to 84 are arranged at four corners of a square or rectangle to be considered for the purpose of explanation only. The output axis 85 of the output shaft 48 passes through the section point of the diagonals of said square or rectangle. Due to this specific arrangement of the four tie rods 81 to 85, the complete height 91 (see FIG. 10) of the rolling contour 49 can be disposed between the two upper tie rods 81, 82 and the two lower tie rods 83, 84. The height 91 of the rolling contour 49 is defined in direction of the output axis 85. The rolling contour 49 does not need any recesses for the tie rods 81 to 84 and may therefore be loaded optimally.

The four tie rods 81 to 84 are respectively connected to the opening piston 51 by screwings 87. At the other ends thereof, the four tie rods 81 to 84 protrude into through-holes of the damper piston 46. Here, the ends of the tie rods 81 to 84 are respectively screwed by a spring tension nut 88. The first tie rod 81 and the third tie rod 83 being arranged diagonally to the first tie rod 81 are respectively tensile-loaded by an integrated clearance compensation spring 86. The integrated clearance compensation springs 86 are fit on the first tie rod 81 and the third tie rod 83 and are located in the damper piston 46. A first end of the clearance compensation springs 86 facing away from the output shaft 48 is supported against the spring tension nut 88 which is screwed to the respective tie rods 81, 83. A second end of the respective clearance compensation springs 86 facing the output shaft 48 is supported against a shoulder 93 (see FIG. 10) which is formed in the damper piston 46. Due to this specific arrangement, the clearance compensation springs 86, which are embodied as pressure springs, may load the first and second tie rods 81, 83 with tension.

In addition, FIG. 9 shows a first sealing flange 89 at the damper piston 46, which seals the damper piston 46 with respect to the door closer housing 42, in particular with respect to the closure damping compartment 58. In a similar manner, the opening piston 51 is sealed with respect to the door closer housing 42 by a second sealing flange 90. The second sealing flange 90 is formed as a supporting shoulder for a piston seal. The opening piston 51 is formed integrally with the second sealing flange 90. These two sealing flanges 89, 90 are used in the piston assemblies 94 of all embodiments.

FIG. 10 shows three sectional views of the piston assembly 94 according to the third embodiment. In section B-B, it is discernible that here again the pocket 71 is formed in the opening piston 51. At the bottom of this pocket, there is the second front face 72. The piston rod 54 engages with this pocket 71, such that the free-swing-function is guaranteed.

The embodiments proposed up to now show two basic possibilities for a clearance compensation between the cam rollers 47, 50 and the rolling contour 49. In the first two embodiments, the damper piston 46 is pressure-loaded by the first pressure spring 45 slightly toward the output shaft 48. The opening piston 51 is pressure-loaded by the second pressure spring 52 slightly toward the output shaft 48. This secures a constant contact between the cam rollers 47, 50 and the rolling contour 49. An alternative is disclosed in the third embodiment. In this case, the clearance compensation is integrated into the piston assembly 94. The damper piston 46 and the opening piston 51 are always slightly constricted by the tie rods 81 to 84 and the integrated clearance compensation springs 89, such that the two cam rollers 47, 50 always abut on the rolling contour 49. In this context, it is particularly advantageous that no moment acts on the output shaft 48 and therewith the door stands still in any possible position during the free-swing-mode. The symmetric and diagonal arrangement of the four tie rods 81 to 84 provides for an absolutely constant force transmission and therewith prevents any canting. For this purpose, the two used clearance compensation springs 46 are arranged at two tie rods 81, 83 being diagonal to each other. As an alternative, one clearance compensation spring 86 could be provided for each of the tie rods 81 to 84. Of course, the clearance compensation springs 86 can preferably be arranged in total or partially also in the opening piston 51. In addition, the tie rods 81 to 84 prevent a twisting of the damper piston 46 and the opening piston 51 with respect to one another.

Further, the piston assembly 94 according to the third embodiment can also preferably be used together with the first pressure spring 45 and/or the second pressure spring 52. A specific application is e.g. given in case of very heavy fire protection doors. The closing force required in case of a fire requires very strong closer springs 56. For the everyday use of the door, it would be desirable that the closer spring 56 always remains biased and closes the door e.g. in case of a fire. Nevertheless, there exists the need for a smooth-running and automatically closing door, wherein said easy closing should occur after each use. Therefore, it is preferable that each of the door closers 41 proposed herein comprises the second pressure spring 52 as an "additional closer spring", embodied e.g. according to EN1 or EN2, wherein said additional closer spring/second pressure spring 52 is much more weaker than the closer spring 56. The second pressure spring 52 in this embodiment therewith always loads the piston assembly 94, in particular the opening piston 51, in the closing direction, even when in free-swing-mode and upon a blocked closer spring 56, such that the door closes, at least if the resistance is not too large, automatically, also during the free-swing-mode.

Nevertheless, the user does not have to tension the large closer spring 56 upon each opening process, but only the much smaller second pressure spring 52. In particular in this embodiment, the piston assembly 94 according to FIGS. 9 and 10 according to the third embodiment can be preferably combined with the second pressure spring 52.

Figure 11:
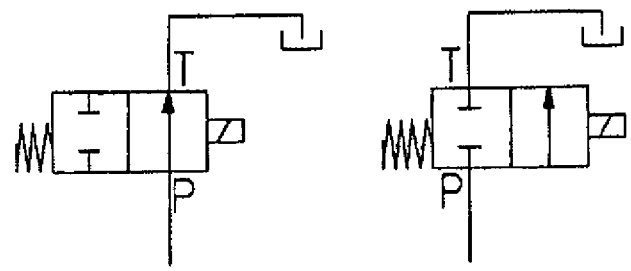
FIG. 11 is a hydraulic switching symbol for a solenoid valve of an inventive door closer according to a fourth embodiment.
Figure 12:
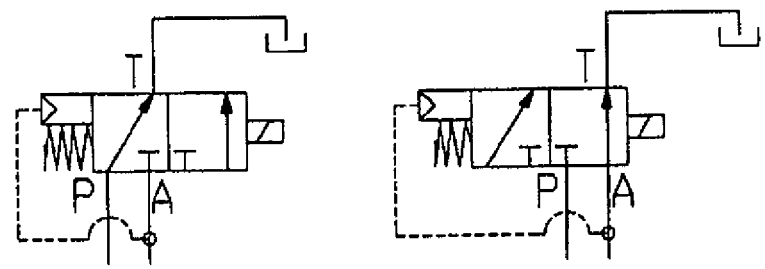
FIG. 12 is a hydraulic switching symbol for a solenoid control valve of an inventive door closer according to a fifth embodiment.
Figure 13:
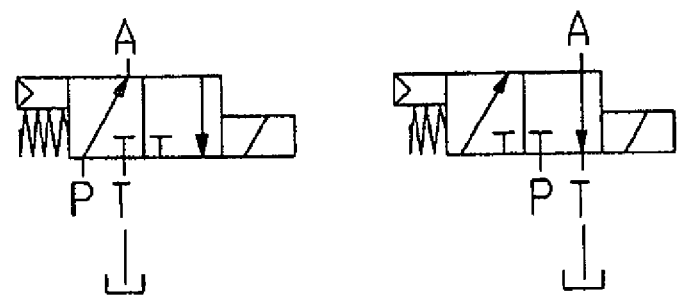
FIG. 13 is a hydraulic switching symbol for a solenoid control valve of an inventive door closer according to a sixth embodiment.

FIGS. 11, 12 and 13 show a fourth, fifth and sixth embodiment for a door closer 41, wherein the switching symbol for the solenoid control valve 1 is respectively shown. FIG. 12 illustrating the fifth embodiment shows the preferred variant.

The fourth embodiment according to FIG. 11 shows a very simple embodiment, in which the operating line A to the closure damping compartment 58 is omitted in such door closer 41. The solenoid control valve 1 here only controls a connection of the pressure line P from the lock compartment 61 to the tank line T. The pressure line P can alternatively be open or closed, such that the free-swing is selectively de-activated or activated.

FIG. 12 shows the switching symbol for the fifth embodiment. Herein, the pressure line P is connected to the tank line T in a de-energized state of the solenoid control valve 1, shown on the left side. The operating line A is blocked. The switching position on the right shows the energized state of the solenoid control valve 1. Herein, the pressure line P and thus the lock compartment 61, and consequently also the closer spring 56, are locked. The closure damping compartment 58 is shorted to the tank via the operating line A.

FIG. 13 shows the switching symbol for the sixth embodiment. According to the left depiction, the pressure line P is connected to the operating line A in a de-energized state. In the energized state according to the right depiction, the pressure line P and thus the lock compartment 61 are blocked. The operating line A and, consequently, the closure damping compartment 58 are shorted to the tank line T.

Figure 14:
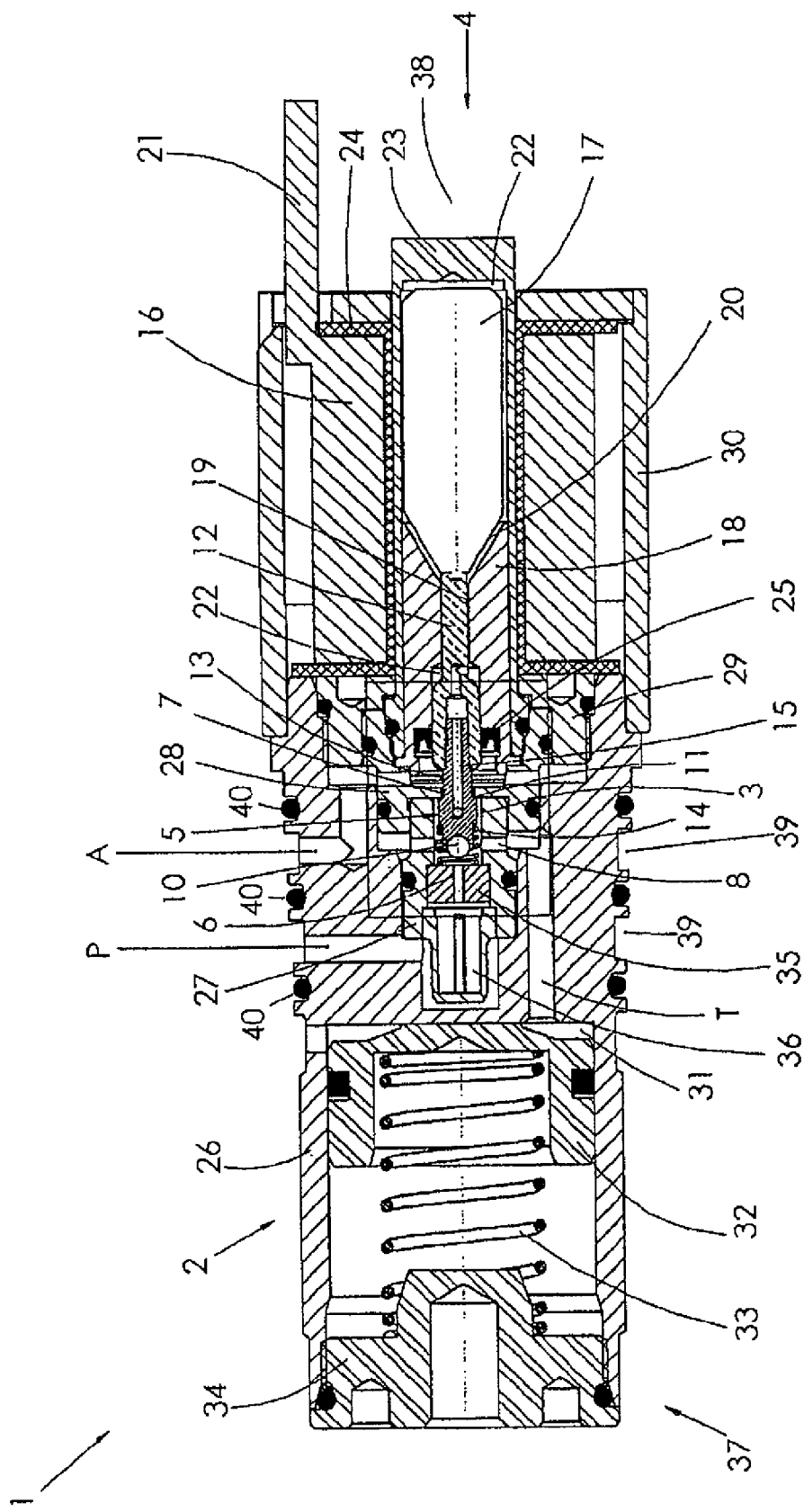
FIG. 14 is the hydraulic 3/2-solenoid control valve of the door closer according to the fifth embodiment in a de-energized position.
Figure 15:
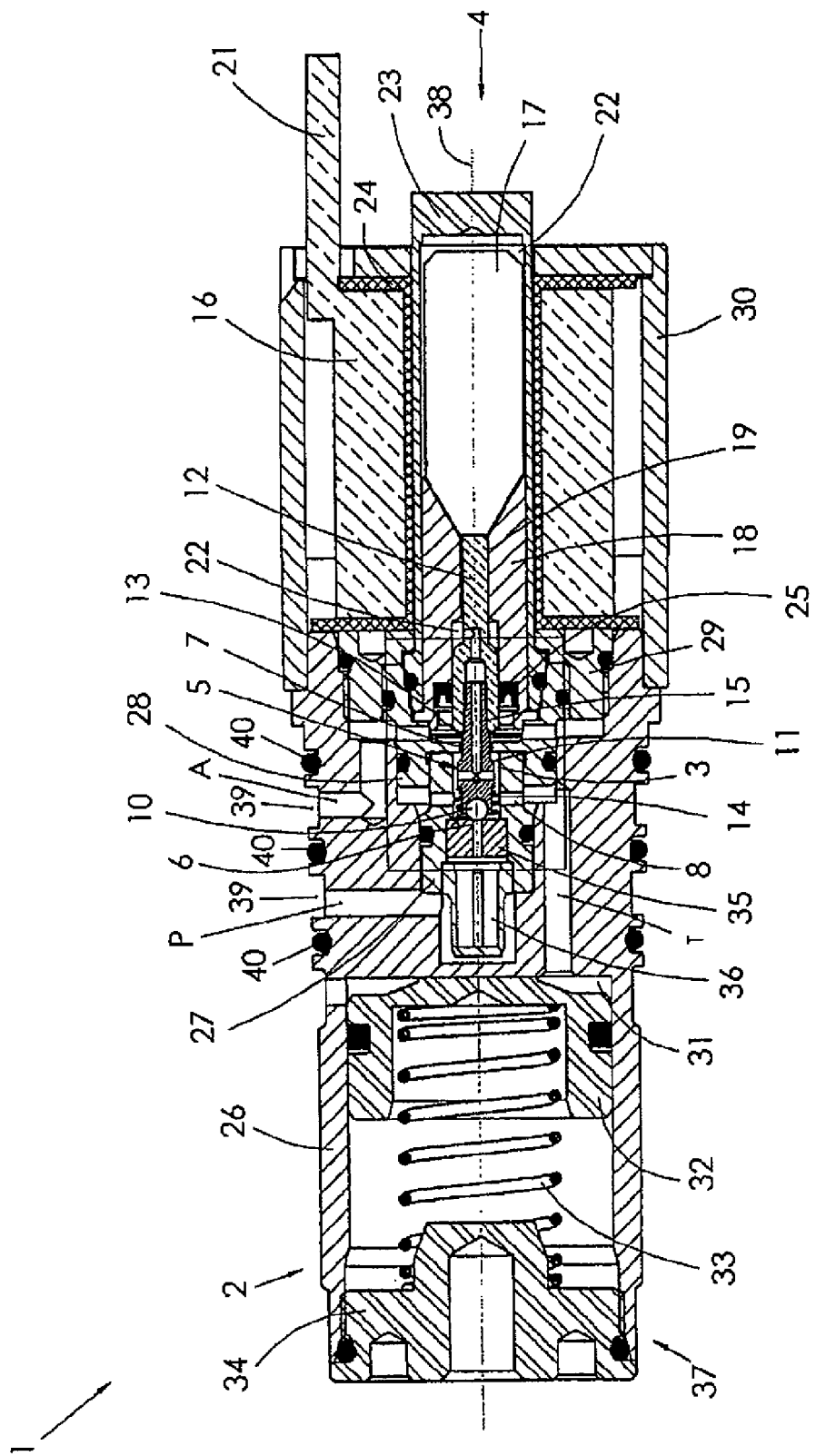
FIG. 15 is the hydraulic 3/2-solenoid control valve of the door closer according to the fifth embodiment in an energized position.
Figure 16:
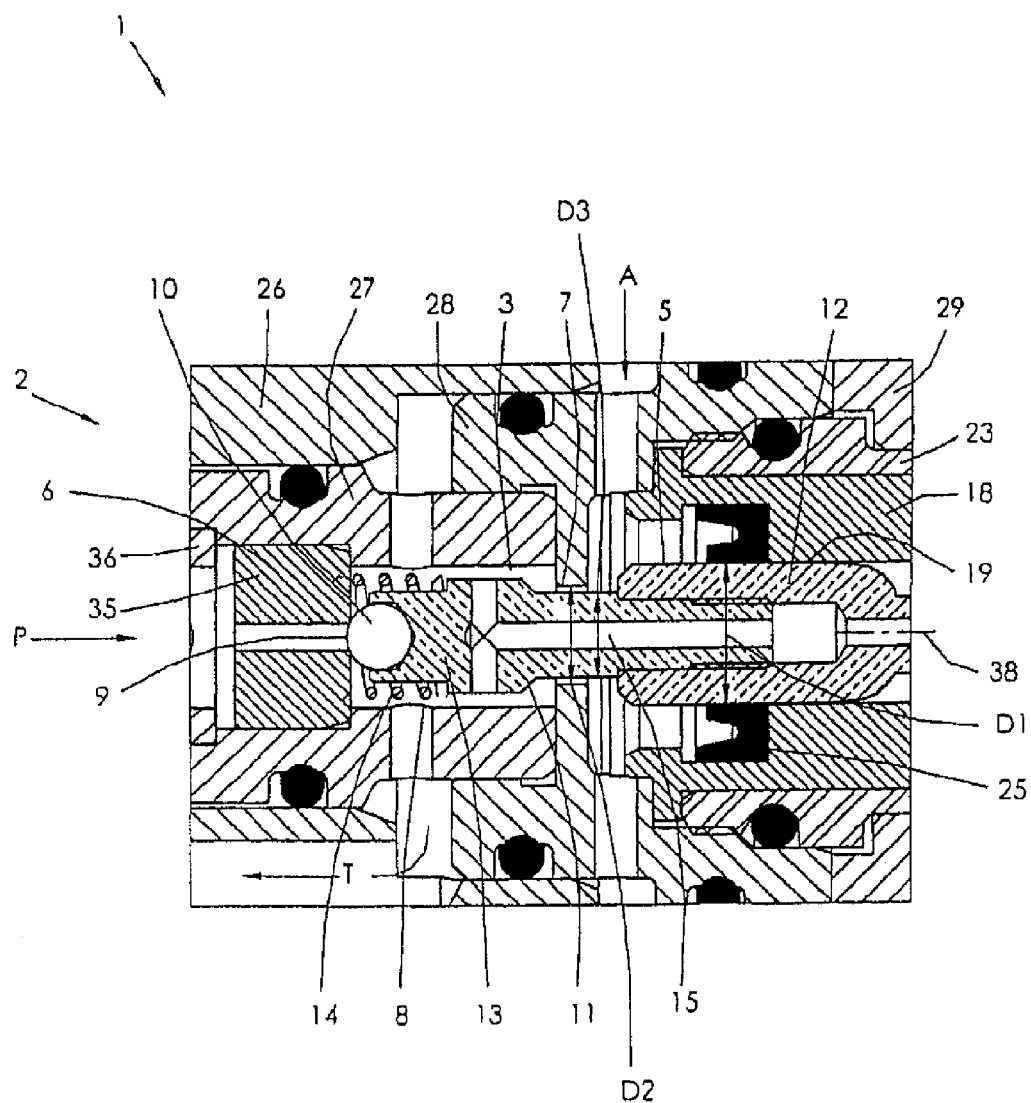
FIG. 16 is a detail of FIG. 15.

FIGS. 14 to 16 show the constructive design of the solenoid control valve 1 of the door closer 41 according to the fifth embodiment. Subsequently, a constructive design of the solenoid control valve 1 for a door closer 41 according to the sixth embodiment is explained based on FIGS. 17 and 18.

Based on FIG. 14, the switching position according to FIG. 12, left side, is shown. FIGS. 15 and 16 show the switching position according to FIG. 12, right side.

FIG. 14 shows a sectional view of the hydraulic 3/2-solenoid control valve in a de-energized state. The hydraulic 3/2-solenoid control valve 1 comprises a valve housing 2, a valve chamber 3 integrated into the valve housing 2, a solenoid 4 and a valve spindle 5. The valve spindle 5 moves in a longitudinal direction along a valve axis 38.

The valve chamber 3 comprises a first valve seat bore 6 as a connection from the pressure line P to the valve chamber 3 and a second valve seat bore 7 as a connection from the operating line A to the valve chamber 3. Further, a free aperture 8 to the tank line T is formed at the valve chamber 3. The first valve seat bore 6 is located directly opposite to the second valve seat bore 7. The free aperture 8 is also formed as a borehole, wherein the borehole of the free aperture 8 is arranged vertically with respect to the first valve seat bore 6 and the second valve seat bore 7. In addition, a diameter of the first valve seat bore 6 is considerably smaller than a diameter of the second valve seat bore 7.

The valve spindle 5 has a split structure and comprises a first part 12 and a second part 13 being screwed into the first part 12 and thus fixedly connected to the first part 12. The second part 13 extends from the interior of the valve chamber 3 through the second valve seat bore 7 toward the solenoid 4. The first part 12 is disposed completely outside the valve chamber 3.

The second part 13 of the valve spindle 5 comprises a first sealing surface, embodied as a convex surface 9 (see in particular FIG. 16) on a side thereof facing the valve seat bore 6. Said convex surface 9 is formed by a ball 10. The ball 10 in turn is embedded into a face side recess of the valve spindle 5, in particular of the second part 13. In addition, a shoulder is formed at the valve spindle 5, in particular at the second part 13. A valve pressure spring 14 is supported on said shoulder. The convex surface 9 is arranged within said valve pressure spring 14. The valve pressure spring 14 is further supported at the front face of the first valve seat bore 6. Said front face can also be referred to as sealing surface or lateral surface of the first valve seat bore 6. Due to this arrangement of the valve pressure spring 14, the valve spindle 5 is loaded toward the solenoid 4. In a de-energized state, this results in an opening of the first valve seat bore 6.

At the second valve seat bore 7, the valve spindle 5, in particular the second part 13, comprises a second sealing surface, embodied as a cone ring surface 11, within the valve chamber 3. Said cone ring surface 11 is formed about the complete circumference of the valve spindle 5. In a de-energized state of the solenoid 4, said cone ring surface 11 is pushed onto the second valve seat bore 7 and therewith seals the operating line A with respect to the valve chamber 3.

The solenoid 4 comprises a coil 16, an armature 17 and a pole core 18. The coil 16 is wound about the armature 17 and the pole core 18. The armature 17 and the pole core 18 are arranged in series along the longitudinal valve axis 38. In the pole core 18, a borehole is formed along the longitudinal valve axis 38. Said borehole forms a linear guide 19 for at least a portion of the valve spindle 5, in particular a portion of the first part 12 of the valve spindle 5. In an energized state, a gap 20 being as small as possible exists between the pole core 18 and the armature 17. In the de-energized state, said gap 20 is larger. The solenoid 4 further comprises a connecting line or voltage supply 21 for connecting a control unit to the hydraulic 3/2-solenoid valve 1. The armature 17 and the pole core 18 are embedded into a sleeve 23. Further, an insulation 24 exists between the sleeve 23 and the coil 16.

The pole core 18 and the armature 17 are arranged in a so-called armature space 22. Said armature space 22 is located within the sleeve 23. The operating line A is sealed with respect to said armature space 22 by a specific seal, in particular a groove ring seal 25. Said groove ring seal 25 is arranged between the valve spindle 5, in particular the first part 12, and the pole core 18. A connection channel 15 is extending within the valve spindle 5. Said connection channel 15 connects the armature space 22 to the valve chamber 3. Since the valve chamber 3 is always freely connected to the tank line T, also the armature space 22 is always pressureless. The connection channel 15 is formed by a longitudinal borehole along the longitudinal valve axis 38 in the valve spindle 5 as well as by boreholes being vertical with respect to the longitudinal valve axis 38 from the surface of the valve spindle 5 to the longitudinally extending borehole.

Due to the split structure of the valve spindle 5, in particular, the longitudinal borehole can be formed along the longitudinal valve axis 38 inside the valve spindle 5.

The valve housing 2 comprises a base housing component 26, a first valve chamber insert 27 and a second valve chamber insert 28. The first valve chamber insert 27 and the second valve chamber insert 28 together form the valve chamber 3. The hydraulic 3/2-solenoid control valve 1 is structured and assembled as follows. An annular extension 29 is disposed at the solenoid 4. A part of the second valve chamber insert 28 is embedded into said extension 29. The second valve chamber insert 28 in turn accommodates the first valve chamber insert 27. The already mentioned sleeve 23 of the solenoid 4 extends to the second valve chamber insert 28 and is connected thereto. The complete unit consisting of solenoid 4, second valve chamber insert 28 and first valve chamber insert 27 is screwed into the base housing component 26. For this purpose, an internal thread is formed at the base housing component 26, and a corresponding external thread is formed at the extension 29 of the solenoid 4. The individual housing components are sealed against each other.

In addition, the housing 2 comprises a cap 30. The cap 30 encases the solenoid 4 and sits on the base housing component 26.

A drilled insert 35 is formed inside the first valve chamber insert 27. The first valve seat bore 6 is formed in said drilled insert 35. In addition, a filter 36 is arranged in the first valve chamber insert 27. Said filter 36 is disposed outside the valve chamber 3 and in the pressure line P.

In addition, a volume compensation unit 37 including the tank compartment 31 is integrated inside the base housing component 26. Said volume compensation unit 37 including the tank compartment 31 comprises a volume compensation piston 32, a compensation spring/length compensation spring 33 and a bearing 35 for the compensation spring 33. The tank compartment 31 is connected to the tank line T. The volume compensation piston 32 defines a wall of the tank compartment 31. The piston 32 is slightly spring-loaded by the compensation spring 33. The compensation spring 33 is supported against the volume compensation piston 32 on one side thereof and against the spring bearing 34 on the other side thereof. The front face of the spring bearing 34 is screwed into the base housing component 26.

The hydraulic 3/2-solenoid control valve 1 is constructed substantially rotation-symmetrically with respect to the longitudinal valve axis 38. The pressure lines P, the operating lines A and the tank lines T obviously deviate from said rotation symmetry. The pressure line P and the operating line A end at respectively at least one position on the circumferential surface of the base housing component 26. At this position, ring channels 39 are formed. Said ring channels 39 are sealed with O-ring seals 40, when the 3/2-solenoid control valve 1, embodied as a cartridge valve, is inserted into a corresponding receptacle.

FIG. 15 shows the hydraulic 3/2-solenoid control valve 1 according to the embodiment in the energized state. Herein, it is clearly visible that the valve spindle 5 was moved to the left compared to the illustration of FIG. 14. Consequently, the operating line A is directly connected to the valve chamber 3 and thus with the tank line T and the tank compartment 31 via the second valve seat bore 7. The pressure line P is blocked by the seating of the ball 10 in the first valve seat bore 6 and is therefore not connected to the valve chamber 3.

FIG. 16 shows a detail of FIG. 15. Based on this illustration, particularly the differential-area-ratio can be explained.

It shall be noted that said differential-area-ratio is used upon a closed second valve seat bore 7 and thus in the de-energized valve position shown in FIG. 14. As shown in FIG. 16, the valve spindle 5 comprises a sealing diameter D1 at the groove ring seal 25. The second valve seat bore 7 has an inner diameter D2. In a region between the groove ring seal 25 and the second valve seat bore 7, the valve spindle 5 has a smallest diameter D3. When the second valve seat bore 7 is closed, the pressure in the operating line A acts on the following surfaces of the valve spindle 5: The first surface is calculated by $(D2^2/4*\pi)-(D3^2/4*\pi)$. The second surface is calculated by $(D1^2/4*\pi)-(D3^2/4*\pi)$. Due to the fact that the first surface is smaller than the second surface, the operating pressure acts to the right in the shown illustration, when the second valve seat bore 7 is closed. Therewith, the valve pressure spring 14 is supported and the cone surface 11 is pulled into the second valve seat bore 7.

Based on the fifth embodiment, it was explained how a hydraulic 3/2-solenoid control valve 1, in particular with a cartridge design, can be formed for an operation free of leakage oil. In the de-energized switching position, shown in FIG. 14, the side of the valve spindle 5 formed as the cone surface 11 is pushed into the second valve seat bore 7 of the operating line by the pressure spring 14 and therewith blocks the connection of said line with respect to the tank in an oil-tight manner. On the magnet side, the valve spindle 5 is radially formed with a groove ring seal. 25 with respect to the armature space 22. The sealing diameter D1 of the valve spindle 5 toward the armature space 22 is larger than the second valve seat bore 7. Therewith, there results a defined area ratio between the cone seat and the sealing diameter D1 of the armature space 22. If the operating line A is pressurized, a differential force is generated through the area ratio between the operating line and the sealed armature space 22, which force pulls the valve spindle 5 toward the solenoid 4 and acts in addition to the elastic force against the second valve seat bore 7. The sealing effect increases with increasing pressure in the operating line A. The solenoid 4 is preferably configured such that a switching against the elastic force plus differential force is prevented. In this position, the pressure line P and the tank line T are connected to each other.

In the energized switching position according to FIG. 16, the operating line A is pressureless, wherein the valve spindle 5 seals, with its ball 10, the pressure line P in an oil-tight manner against the elastic force. A consumer connected through the pressure line P, e.g. the lock compartment 61, can now be effectively sealed until the rated operating pressure is reached. Said operating pressure is dependent on the magnetic force. In this switching position, the operating line A is connected to the tank line T without pressure. Therewith, no pressure or only a small dynamic pressure can build up in the operating line A.

The embodiments of the proposed 3/2-solenoid control valve are applicable according to the invention also for other valve designs, independent from the cartridge design and independent of the number of lines and/or switching positions. In particular a combination of ball seat and cone seat in a valve, in particular on a valve spindle, and/or the differential-area-ratio are applicable for other valves according to the invention.

Figure 17:
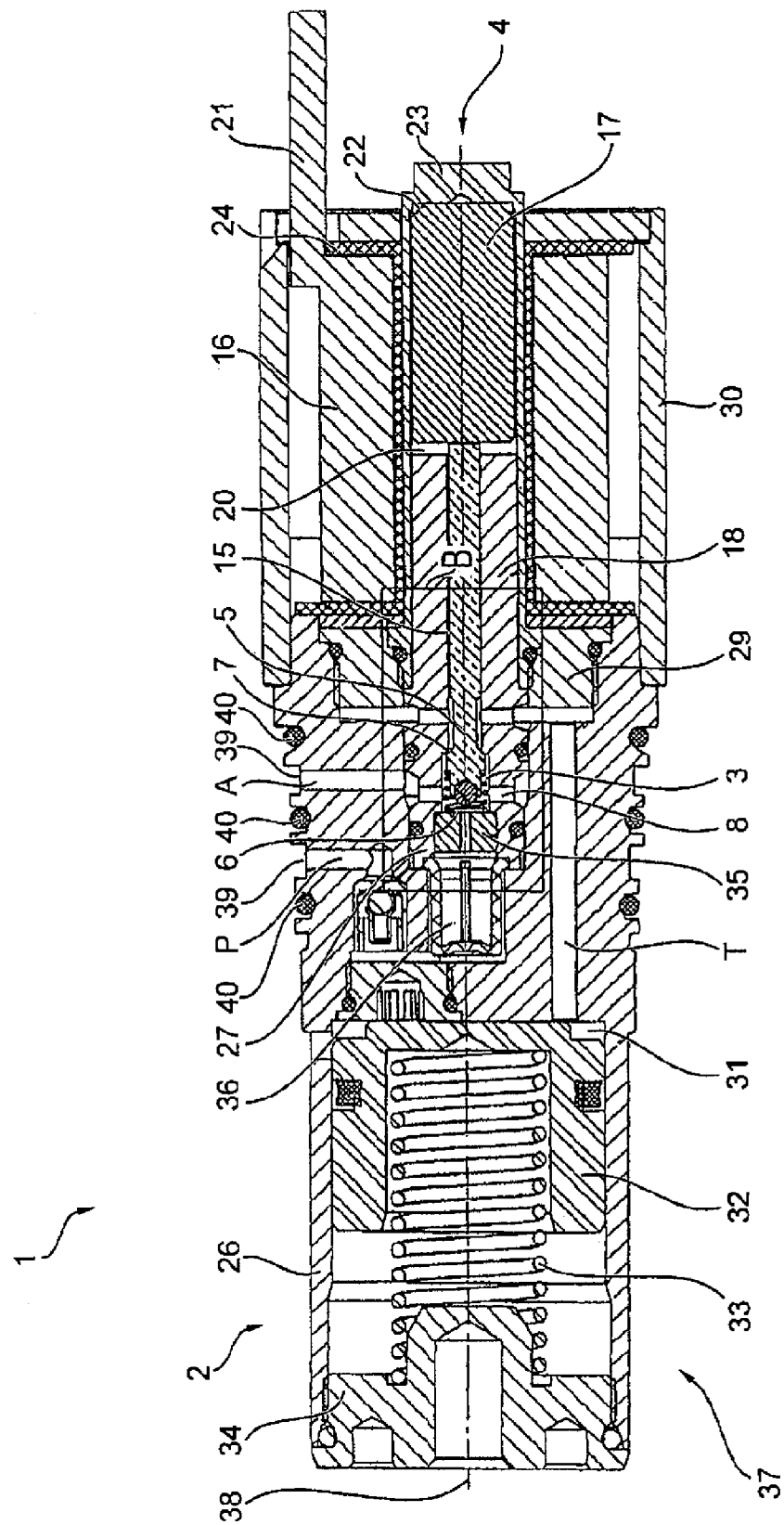
FIG. 17 is the hydraulic 3/2-solenoid control valve of the door closer according to the sixth embodiment in a de-energized position.
Figure 18:
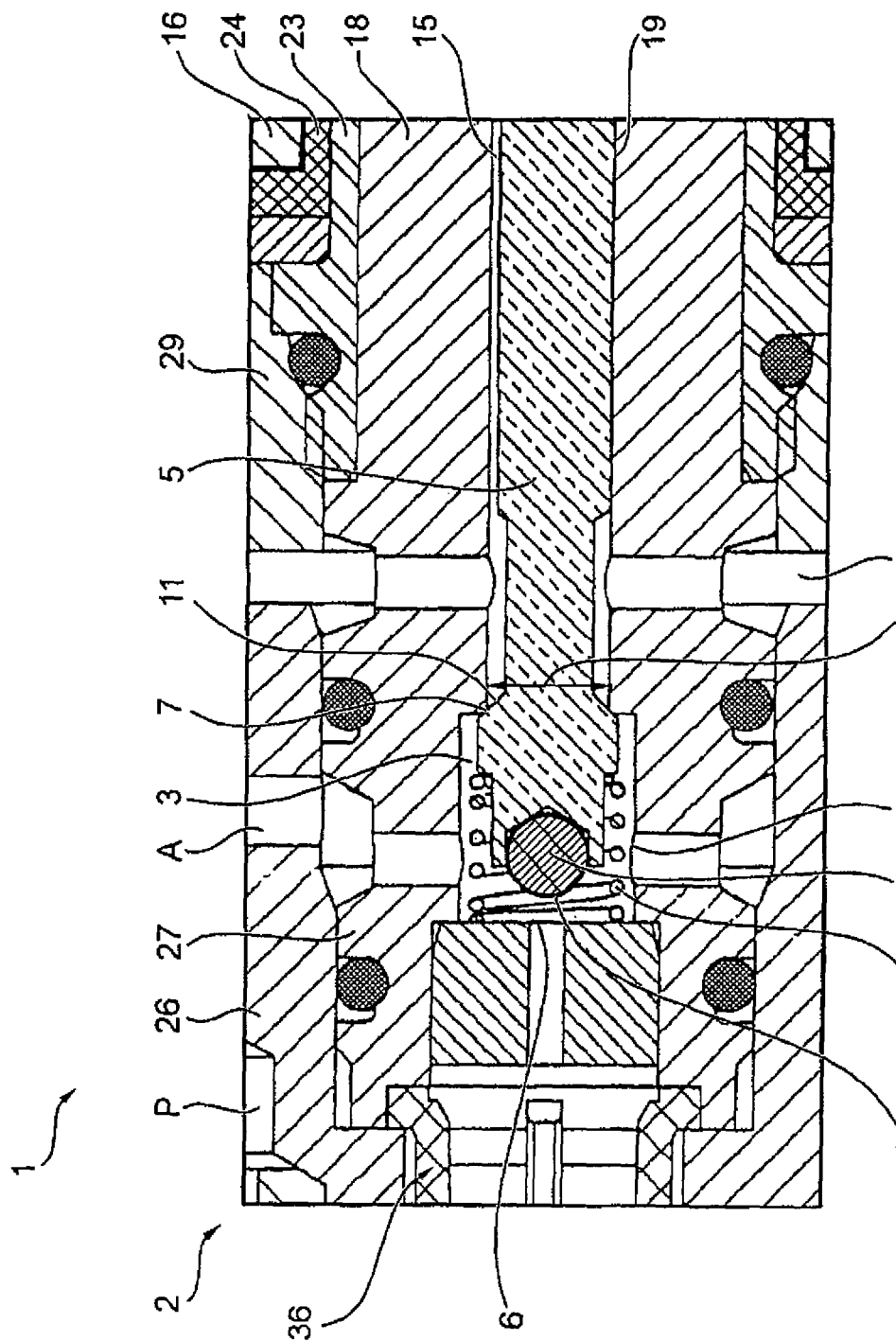
FIG. 18 is a detail of FIG. 17.

Based on FIGS. 17 and 18, the constructive design of the solenoid control valve 1 of the door closer according to the sixth embodiment is now explained in more detail. Both figures show the de-energized switching position with an open pressure line P, as shown schematically on the left side of FIG. 13. Identical components or components identical in function are designated with identical reference numerals in all embodiments. In particular, the solenoid control valve 1 used in the sixth embodiment corresponds to the solenoid control valve 1 used in the fifth embodiment, except for the differences described in the following.

As shown in FIGS. 17 and 18, the tank line T and the operating line A are interchanged in the sixth embodiment compared to the fifth embodiment. This means that the operating line A is always connected to the valve chamber 3 through the free aperture 8. The connection between the valve chamber 3 and the tank line T is controlled by the second valve seat bore 7 and the cone ring surface 11. In addition, the valve spindle 5 of the sixth embodiment is formed in one piece. Further, the path for the pressure compensation between the armature space 22 and the tank line T is shorter in the solenoid control valve 1 according to the sixth embodiment. Herein, the connection 15 is formed as a simple flat surface between the armature space 22 and the tank line T. No boreholes are required in the valve spindle 5. The connection 15 is formed as a flat surface on the valve spindle 5 or by forming the valve spindle 5 as a polygon.

In addition, the valve housing 2 in the solenoid valve 1, according to the sixth embodiment is designed somewhat simpler. The valve chamber 3 is no longer structured in two parts including a first valve chamber insert 27 and a second valve chamber insert 28. Rather, only one valve chamber insert 27 is used in this embodiment.

The solenoid valves according to the fourth, fifth and sixth embodiments of the door closer 41 can preferably be used in all embodiments of the door closer 41 proposed herein.

Figure 19:
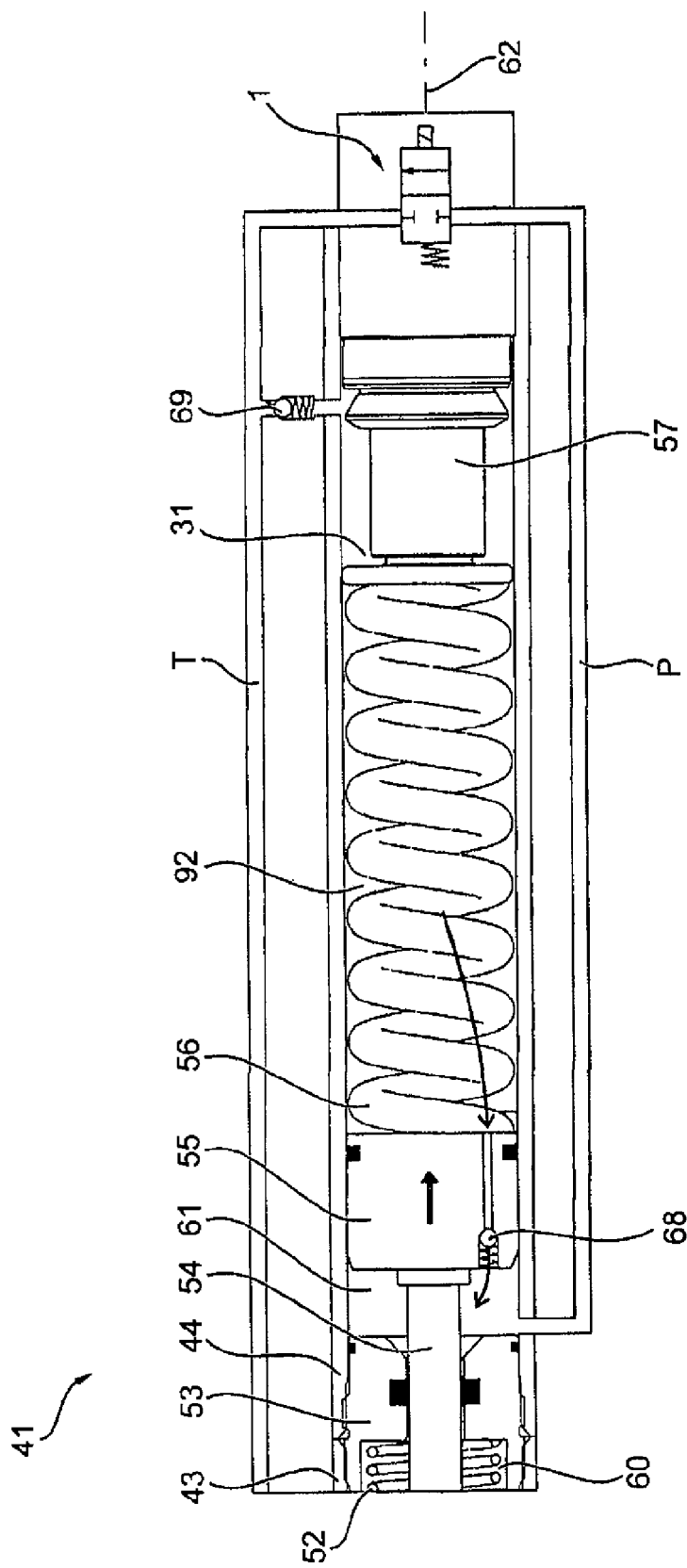
FIG. 19 is an inventive door closer according to a seventh embodiment.

FIG. 19 shows a door closer according to a seventh embodiment. Identical components or components identical in function are designated with identical reference numerals in all embodiments. The assembly for avoiding a so-called rebound of the closer spring tension piston 55 proposed in the seventh embodiment can preferably be used in all embodiments of the door closer 41 proposed herein.

FIG. 19 shows an embodiment of the third check valve 68 in the closer spring tension piston 55 as a spring-loaded check valve. The space inside the door closer housing 42, in particular inside the second door closer housing part 44, in which the closer spring 56 is arranged, is herein referred to as closer spring accommodating space 92. Said closer spring accommodating space 92 is a space which becomes smaller during the opening process of the door, since the closer spring tension piston 55 moves to the right. In addition, FIG. 19 shows the fourth check valve 69 also as a spring-loaded check valve. The third check valve locks the hydraulic flow from the lock compartment 61 into the closer spring accommodating space 92. The fourth check valve locks the hydraulic flow from the closer spring accommodating space 92 into the tank line T.

The closer spring accommodating space 92 and the tank compartment 31 herein are a space with hydraulic interconnection. The supporting disc for the spring 56 shown in the adjusting unit 57 is no hydraulic separating wall.

When pressure builds up in the lock compartment 61, all elastic members arranged therein, e.g. seals, residue air or also the hydraulic fluid, are compressed accordingly, which results in an undesired loss of volume. The spring tension piston 55 compensates this loss of volume, however, performs a small subsequent stroke. Finally, the closer spring tension piston 55 does not exactly stop at the desired position. The assembly shown in FIG. 19 reduces this rebound by pumping the hydraulic oil, being actively pre-pressurized, from the closer spring accommodating space 92 through the third check valve 68 into the lock compartment 61 during the opening process. Therewith, a relative opening resistance, similar to an opening damping, is intentionally generated in order to bias the hydraulic oil and to obviate the compression-set-behaviour. By virtue of the fourth check valve 69, the hydraulic oil cannot escape from the closer spring accommodating space 92 toward the tank line T. Thus, the hydraulic oil is biased in the closer spring accommodating space 92 by the closer spring tension piston 55 during the opening process and flows into the lock room 61 with a specific pre-pressure. Therewith, the undesired rebound is considerably reduced.

Further, the following components and preferred specifications are provided according to the invention.

Preferably, the free-swing assembly is arranged between the piston rod and the piston assembly. As an alternative, the free-swing assembly is preferably arranged in the piston rod or between the piston rod and the closer spring, in particular between the piston rod and the closer spring tension piston.

Further, it is advantageous that the free-swing assembly comprises a first front face arranged vertically with respect to the longitudinal door closer axis and being fixedly connected to the piston rod as well as a second front face in parallel with the first front face and fixedly connected to the piston assembly, wherein the second front face lifts off from the first front and thus decouples when the closer spring is locked. By means of two abutting and lifting front faces, a very simple and efficient free-swing assembly can be realized as a sliding-coupling.

Advantageously, a pocket is formed in the piston assembly, wherein the piston rod is guided movably within the pocket. As an alternative, the pocket can also be formed in the spring tension piston. In a further alternative solution, the piston rod is formed of two parts, wherein, in this case, the one part of the piston rod comprises a pocket opening toward the longitudinal door closer axis and the other part of the piston rod is disposed in this pocket to be movable in a translational direction.

Preferably, the door closer comprises an additional piston guided in the door closer housing between the piston assembly and the piston rod and fixedly connected to the piston rod, wherein the first front face is formed at the additional piston. The piston rod and the additional piston are fixedly connected, i.e. they always move together along the longitudinal door closer axis.

In a preferred embodiment of the additional piston, it is provided that the connection between the piston rod and the additional piston is formed pivotally about a first axis perpendicular to the longitudinal door closer axis. Due to this pivotal arrangement, possible forces, which do not extend linearly to the longitudinal door closer axis and could therefore result in a seizure, are prevented.

In addition, it is preferably provided that the connection between the piston rod and the closer spring tension piston is formed pivotally about a second axis perpendicular to the longitudinal door closer axis and the first axis. Also due to this pivotal connection between the piston rod and the closer spring tension piston, a possible seizure is prevented.

In case of a non-locked state of the lock compartment, the closer spring can act on the piston assembly through its biasing force via the piston rod in direct pressure contact inside the free-swing-coupling, or in the opposite direction, the piston assembly may act on the piston rod. In this state, a normal door closer operation exists, in which the closer spring is manually tensioned and, upon release of the door, the closer spring moves the door back into the initial position through the piston assembly and the output shaft. In case, however, the closer spring is hydraulically arrested, e.g. by energizing a solenoid valve, the hydraulic oil can no longer flow from the lock compartment. Consequently, the spring force can no longer act on the piston assembly, after the closer spring was manually tensioned once. When the door is manually moved from the open position back into the direction of closing, the piston rod within the free-swing assembly, in particular within the sliding-coupling, lifts off from the piston assembly. The piston assembly itself moves, driven by the door and the output shaft, and performs a small stroke. Inside the free-swing assembly, a distance between the first front face and the second front face is generated, which distance corresponds to the stroke. The returning motion of the piston assembly due to an anew opening of the door occurs without force, which corresponds to a free-swing-function. Further manual opening and closing motions of the door occur upon a still locked lock compartment as often as desired and without force in the free-swing-mode. Only upon release of the lock compartment, the closer spring can be restored to a released state. In this case, the first front face is brought into abutment with the second front face in the free-swing assembly and the force of the closer spring is transmitted to the door through the piston assembly and the output shaft. Therewith, the door is securely closed by the stored energy without any additional manual action being required.

In a preferred embodiment, it is provided that the output shaft comprises a cam-shaped rolling contour, in particular a cam disc, and that the piston assembly comprises at least one cam roller abutting on the rolling contour. Door closers including sliding rails have prevailed in the last years due to optical reasons. In order to simultaneously obtain a comfortable operation, i.e. a decreasing opening resistance or decreasing opening moment upon increasing door angle, a cam technology is preferably used within the door closer mechanism of the inventive door closer, in order to transmit the force between the piston assembly and the output shaft.

In a preferred embodiment of the piston assembly, it is provided that the piston assembly comprises a damper piston including a first cam roller and an opening piston including a second cam roller, wherein the output shaft is arranged between the damper piston and the opening piston. The cam rollers of the damper piston and of the opening piston have to be in constant contact with the rolling contour, and thus roll on the rolling contour when the output shaft is rotated. Therewith, a working stroke is generated for the damper piston and the opening piston. On the longer side of the door closer housing, the closer spring is biased through the opening piston and the piston rod. On the other side thereof, the hydraulically effective damper piston is displaced. By displacing the damper piston, the hydraulic volume is displaced, such that the door velocity during the closing process is controlled or braked by interposed throttle valves. In combination with the force of the closer spring, a resultant force is generated through the cam geometry of the rolling contour, which force generates the opening and closing moment by the corresponding internal lever arm. In order to design the proposed door closer as slender as possible, the opening piston and the damper piston are preferably arranged in a specific way: The damper piston is disposed on one side of the output shaft and the opening piston is disposed on the other side of the output shaft, such that the output shaft is arranged between these two pistons. Consequently, no direct contact is possible between the opening piston and the damper piston. Said very slender constructional design of the door closer provides that a combination of both functions, biasing the closer spring and dampening the closing process, is not directly possible within one component. The realization of the hydraulic auxiliary function "free-swing" therefore requires elaborate elements both housing sides, since the functional areas are arranged separately within the housing. For a comparison: In case of widely designed floor door closers, only one piston is generally provided on the spring side, which simultaneously realizes the closer spring biasing and the damping function. In this case, however, a so-called tab carriage is used, which surrounds the cam contour including the two rollers supported therein and secures a constant monitoring of the cam-roller-contact. Upon use of said plate-carriage, no further considerations are required for securing the clearance-free contact between the two pistons of the piston assembly and the rolling contour. However, such a plate-carriage cannot be used in integrated and very slender constructed door closers, as they are proposed herein. In addition, when using a cam technology, it has to be considered that small strokes and thus small volume displacements with simultaneous high tensile force requirements are present, which is a disadvantage compared to the common rack-and-pinion technologies. Cam door closers therefore require sustainable bearings and elaborate hydraulic component arrangements. In the following, two variants are disclosed, which enable that the two separated pistons, the opening piston and the damper piston, always have a clearance-free contact with the rolling contour. A first variant uses tie rods and internal clearance compensation springs. The second variant uses pressure springs which engage outside at the opening piston and/or the damper piston.

Preferably, it is provided that the damper piston and the opening piston are connected via tie rods. Since the opening piston and the damper piston are arranged on both sides of the output shaft, no direct contact between these two pistons is possible. The tie rods enable a connection of the two pistons, which can be assembled and manufactured easily. In addition, the use of a plurality of tie rods results in an efficient prevention of twisting of the two pistons about the longitudinal door closer axis.

Further preferred is the use of exactly four tie rods. The four tie rods can be distributed evenly across the cross-section such that a constant transmission of force is possible.

In a particularly preferred embodiment, it is provided that respectively two of the four tie rods are arranged symmetrically with respect to the longitudinal door closer axis. This means that respectively two diagonally opposed tie rods have the same distance to the output shaft. In particular, the four tie rods are arranged at corners of an imaginary square or rectangle. The output shaft passes through the section point of the diagonals of said square or rectangle. Due to this arrangement, an absolutely constant transmission of force between the opening piston and the damper piston, which transmission is directed in parallel with the longitudinal door closer axis, is possible and a seizure of the piston assembly is prevented as far as possible.

In a particularly preferred embodiment, it is provided that two tie rods are arranged above the rolling contour and on both sides of the output shaft, and two further tie rods are arranged below the rolling contour and on both sides of the output shaft, such that the overall height of the rolling contour is arranged between the two upper tie rods and the two lower tie rods. Due to the tie rods arranged above and below the cam portion or the rolling contour, the complete load capacity of the rolling contour can be maintained.

Preferably, it is provided that the piston assembly comprises at least two integrated clearance compensation springs, wherein at least two tie rods being arranged diagonally to each other are tensile-loaded by the clearance compensation springs, in order to compensate for a clearance between the rolling contour and the cam rollers. These two tensile-loaded tie rods provide for a clearance compensation between the cam rollers of the two pistons and the rolling contour, and the other two diagonal rods serve to prevent twisting and therewith prevent tilting moments and related friction or seizing of the opening piston and the damper piston.

Preferably, the clearance compensation springs are arranged in the damper piston and/or in the opening piston. Therefore, no springs engaging from outside at the piston assembly are required for a clearance compensation between the cam rollers and the rolling contour. Therewith, the piston assembly does not have to be supported against stationary portions of the door closer and can itself secure the clearance compensation due to the internal arrangement of tie rods and clearance compensation springs.

In a preferred manner, the tie rods protrude through the clearance compensation springs, wherein the clearance compensation springs are formed as pressure springs and press against the ends of the tie rods, such that the tie rods are tensile-loaded. The other ends of the clearance compensation springs are supported against the opening piston or the damper piston. The ends of the tie rods not being tensile-loaded are respectively screwed fixedly into the respectively other piston.

As an alternative or in addition to the use of tie rods and clearance compensation springs, it is preferably provided that a first pressure spring is arranged between the damper piston and the door closer housing, wherein the first pressure spring is configured for a clearance compensation between the rolling contour and the first cam roller of the damper piston. This first pressure spring pressurizes the damper piston slightly toward the output shaft.

Further, it is preferably provided that a second pressure spring is arranged between the opening piston and the piston rod or between the opening piston and the additional piston or between the opening piston and the separating wall, wherein the second pressure spring is configured for a clearance compensation between the rolling contour and the second cam roller. This second pressure spring, similar to the first pressure springs, provides for a clearance compensation between the cam roller and the rolling contour. Preferably, the first pressure spring and/or the second pressure spring is/are weak enough, such that they do not transmit any torque to the door being perceptible for the user, but only provide for the clearance compensation in the cam mechanism.

In a preferred embodiment, it is provided that an additional closer spring is arranged between the piston assembly and the piston rod or between the piston assembly and the additional piston or between the piston assembly and the separating wall, in order to load the piston assembly slightly toward the closing direction when in free-swing-mode, wherein the additional closer spring is weaker than the closer spring. The closer spring fulfilling the fire protection function and being configured very strong, is preferably tensioned once and then remains locked via the lock compartment until a possible case of fire. For the everyday use of the door, it is however also often desirable that the door closes after use, however, not with the force of a strong closer spring used for emergency cases. For this purpose, the additional weaker closer spring is used. In particular, this additional closer spring is configured according to EN1 or EN2 pursuant to DIN EN1154. A so-called second pressure spring for a clearance compensation between the cam roller of the opening piston and the rolling contour was already described. Said second pressure spring is preferably replaced by the additional closer spring. As an alternative, the use of piston assembly internal tie rods and clearance compensation springs can be combined with the additional closer spring.

Preferably, it is provided that a spring-loaded check valve is arranged between the lock compartment and a compartment becoming smaller during the opening process of the door. This space becoming smaller during the opening process is in particular the accommodating space for the closer spring. The spring-loaded check valve locks toward the space becoming smaller. According to one embodiment of the invention, a hydraulic pressure is built up and maintained in the lock compartment, in order to arrest the closer spring. For a pressure generation in the lock compartment, all elastic members contained therein, e.g. seals, residue air or also the hydraulic oil itself, are compressed accordingly. This results in an undesired loss of volume. The closer spring tension piston compensates for this loss of volume, however, performs a small subsequent stroke. This subsequent stroke is transmitted to the piston rod and consequently to the piston assembly, the output shaft and the door. This results in a turning back of the door by several degrees when using the locking function. In case the free-swing-function is used, the subsequent stroke has the effect that the door cannot be opened completely to the desired position. This undesired effect is referred to as rebound, which becomes noticeable in particular in case of restricted door opening angles determined by structural conditions. This effect is especially pronounced in case of door closers with cam technology due to the small rotary angle-stroke-ratio. The arrangement proposed herein, including the spring-loaded check valve, reduces said rebound by pumping the hydraulic oil, being actively pre-pressurized, from a pressure compartment becoming smaller in the opening direction through the third check valve into the lock compartment during the opening process. Therewith, a relative opening resistance, similar to a opening damping, is intentionally generated in order to bias the hydraulic oil and to obviate compression-set-characteristics. In pre-known arrangements, the hydraulic oil is only passively suctioned from the tank compartment into the pressure compartments during the opening process, which may partially even generate a slightly negative pressure. The elastic members therewith completely relax and require a relatively high compensation volume including a corresponding subsequent stroke in order to enable again a holding pressure sufficient for the spring force. In this case, a maximum pressure difference exists. In the case described herein, the compression-set-characteristics of the elastic members in the lock compartment therefore occur during a slight pressure difference, as a result of which the loss of volume and thus the subsequent stroke is smaller. Accordingly, the turning back or the rebound of the piston assembly from the intended position is considerably smaller.

Preferably, the check valve is arranged such that the hydraulic oil in the space becoming smaller is pre-pressurized by the opening process and is thus actively pumped through the check valve into the lock compartment.

Preferably, the check valve is arranged in the closer spring tension piston.

Further, it is advantageous that the space becoming smaller is closed, except for the check valve, during the opening process.

This closing is in particular achieved by arranging a further check valve between the space becoming smaller and the tank line, wherein the further check valve locks toward the tank line. Therewith, hydraulic oil e.g. present in the accommodating space of the closer spring is biased during the opening process and can be pumped into the lock compartment through the spring-loaded check valve in the closer spring tension piston.

The invention further comprises a hydraulic solenoid control valve, in particular a hydraulic 3/2-solenoid control valve, comprising a valve housing, a solenoid and a valve spindle. A valve chamber is integrated into the housing. This valve chamber comprises a first valve seat bore as a connection to a first line, in particular a pressure line, a second valve seat bore as a connection to a second line, in particular an operating line, and a free aperture to a third line, in particular a tank line. The aperture is referred to as "free", since it connects the valve chamber to the third line in any switching position of the valve. The valve spindle is at least partially arranged within the valve chamber and is linearly moved by the solenoid. Further, the valve spindle comprises, within the valve chamber, a first sealing surface facing the first valve seat bore and a second sealing surface facing the second valve seat bore, such that selectively the first valve seat bore or the second valve seat bore can be closed. In addition, the valve spindle protrudes from the valve chamber through the second valve seat bore and through the second line toward the solenoid. Due to the protrusion of the valve spindle from the valve chamber, the valve spindle can be connected to the solenoid or can be partially integrated into the solenoid. In case the second valve seat bore is closed, the valve spindle is pulled into the second valve seat bore by a differential-area-ratio through the pressure of the second line, in particular the operating line. This arrangement including a differential area ratio promotes a sealing of the second valve seat bore free of leakage oil.

This differential-area-ratio is in particular achieved in that a sealing diameter of the valve spindle outside the valve chamber is larger than a diameter of the second valve seat bore. The sealing diameter is defined at a seal between the valve spindle and the solenoid.

Preferably, the differential-area-ratio is obtained by configuring the diameter of the valve spindle outside the valve chamber to be larger than the bore diameter of the second valve seat bore. Therewith, the pressure of the second line in front of the valve chamber can support the force of the pressure spring, when the second valve seat bore is closed, and pull the second sealing surface into the second valve seat bore.

In a further preferred embodiment, the valve spindle consists of at least two parts. For this purpose, the valve spindle comprises a first part and a second part, wherein the first part is guided to be linearly movable in the solenoid and the second part is screwed into the first part. Consequently, the second part is fixedly connected to the first part and is linearly movable together with the first part. In particular for providing the differential-area-ratio, this two-part form of the valve spindle is especially easy to assemble. Therewith, in particular the sealing diameter can be configured to be larger than the bore diameter of the second valve seat bore.

It is preferably provided that a seal, in particular a groove ring seal, is arranged between the valve spindle and an armature space of the solenoid. Said seal is disposed at the already discussed sealing diameter between the valve spindle and the solenoid. Particularly preferred, the armature space is always freely connected to the third line, in particular the tank line, via a connection channel extending through the valve spindle. Therewith, a pressure generation in the armature space upon a possible leakage of the groove ring seal is prevented. The connection channel within the valve spindle extends from the armature space through the valve spindle into the valve chamber. As already described, the valve chamber is always freely connected to the third line, in particular the tank line.

As an alternative to the afore-described hydraulic solenoid valve, the invention comprises a hydraulic solenoid control valve, in particular a hydraulic 3/2-solenoid control valve, comprising a valve housing, a valve chamber integrated into the valve housing and including a first valve seat bore as a connection to a first line, in particular a pressure line, a free aperture to a second line, in particular an operating line, and a second valve seat bore as a connection to a third line, in particular a tank line. Further, this hydraulic control solenoid valve comprises a solenoid and a valve spindle moved by said solenoid and partially arranged in the valve chamber. The valve spindle comprises, within the valve chamber, a first sealing surface facing the first valve seat bore and a second sealing surface facing the second valve seat bore, such that selectively the first valve seat bore or the second valve seat bore can be closed. Further, the valve spindle extends from the valve chamber through the second valve seat bore toward the solenoid.

In a preferred embodiment of the alternative hydraulic solenoid valve, it is provided that a connection of the third line to an armature space of the solenoid exists along the valve spindle or inside the valve spindle, such that a pressure generation in the armature space is prevented. In particular, this connection is realized by configuring a flat surface at the valve spindle, or by manufacturing the valve spindle as a polygon, in particular a hexagon.

In the following, advantageous embodiments of the two inventive hydraulic solenoid valves are described.

In a preferred embodiment, it is provided that the diameter of the first valve seat bore is smaller than a diameter of the second valve seat bore.

In a preferred embodiment, a pressure spring is arranged between the first valve seat bore and the valve spindle. In the variant including a ball, the inventive valve may therefore be referred to as a spring-loaded ball-cone-seat valve.

In a further preferred embodiment, it is provided that the second sealing surface, in particular the cone surface, seals the second valve seat bore in a de-energized state of the solenoid, and that the first sealing surface, in particular the convex surface, seals the first valve seat bore in an energized state of the solenoid. The preferably provided pressure spring serves to press the second sealing surface of the valve spindle into the second valve seat bore in a de-energized state.

Preferably, the first sealing surface comprises a convex surface, in particular a ball. Further preferably, the second sealing surface comprises a cone surface, in particular a cone ring surface. By linearly displacing or moving the valve spindle, the first valve seat bore is closed by the convex surface or the second valve seat bore is closed by the cone surface, selectively. A seizure in the switching position under pressure is effectively prevented by the ball valve embodiment including the convex surface.

Further, the invention preferably comprises a filter, in particular in the first line. Particularly preferred, the filter is arranged outside the valve chamber directly in front of the inlet into the first valve seat bore. The filter prevents pollution of the oil and in particular a pollution of the two valve seats. In a further preferred embodiment, the first valve seat bore is arranged directly opposite to the second valve seat bore. In a preferred embodiment, the solenoid comprises a coil, an armature, a pole core as well as a gap between the pole core and the armature. The pole core comprises a borehole along the longitudinal axis of the valve spindle and therefore provides an accommodation and a linear guidance for the valve spindle. Further preferably, the inventive solenoid valves comprise a control unit for the solenoid. By said control unit, the solenoid can be switched between energized and de-energized.

Further, the invention comprises a hydraulic cartridge solenoid control valve, in particular a hydraulic cartridge 3/2-solenoid control valve, comprising one of the afore-described hydraulic solenoid valves, wherein the housing is configured to be at least partially inserted into a valve adapter. Said valve adapter is located in a component which integrally accommodates the cartridge 3/2-solenoid control valve. Particularly preferred, the first line, in particular the pressure line, and the second line, in particular the operating line, are directed radially or vertically outwardly with respect to the longitudinal axis of the valve spindle. In addition, O-ring seals are preferably arranged laterally of the outwardly directed first and second lines on the surface of the valve housing, such that these lines can be connected pressure-tight by inserting the cartridge housing. Particularly preferred, the valve housing comprises circumferentially extending ring channels for this purpose. Starting at these ring channels, a plurality of radially directed channels for the first line and/or a plurality of radially directed channels for the second line may preferably lead to the valve chamber.

Further, it is preferred that the hydraulic cartridge solenoid valve comprises a volume compensation unit including a tank compartment. This volume compensation unit including a tank compartment is integrated into the valve housing or connected to the valve housing by a flange. The tank compartment is preferably connected to the third line. The valve is preferably structured along the longitudinal axis of the valve spindle as follows: The valve chamber including the valve spindle is arranged in the center. On one side of the chamber, the volume compensation unit including the tank compartment is integrated or connected by a flange. On the other side of the valve chamber, the solenoid is mounted. Therewith, the hydraulic cartridge solenoid control valve can be inserted into a component with the volume compensation unit to the fore. The solenoid and in particular a plug at the solenoid preferably protrude from the component. In a preferred embodiment, the tank compartment of the volume compensation unit is slightly pressure-loaded by a volume compensation piston and a compensation spring/pressure spring.

In addition, one embodiment of the invention comprises a door closer, in particular a hinge door closer, including a free-swing-function, comprising one of the afore-described hydraulic solenoid valves or one of the hydraulic cartridge solenoid valves, wherein the valve adapter is formed in the door closer. The hydraulic solenoid valve or the cartridge solenoid valve is thus integrated into the housing of the door closer or connected thereto by a flange, and serves to control the hydraulic between the closure damping compartment, the lock compartment and the tank compartment or the tank line.

The door closer including the hydraulic solenoid control valve further comprises preferably a door closer housing, an output shaft to be connected to a door, a piston assembly connected to the output shaft and guided within the door closer housing, a closer spring, a piston rod arranged to connect the piston assembly and the closer spring, a free-swing assembly configured to enable a translational motion of the piston assemblies de-coupled from the closer spring when the closer spring is locked, and a hydraulic lock compartment configured to lock the closer spring.

The afore-described advantageous embodiments of the inventive door closer are accordingly preferably applied in the door closer including the hydraulic solenoid control valve or the hydraulic cartridge solenoid control valve.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A door closer, including at least one of a locking function and a free-swing function, comprising:
    a door closer housing;
    an output shaft configured to connect to a door;
    a piston assembly connected to the output shaft and guided in the door closer housing;
    a closer spring;
    a piston rod that connects the piston assembly to the closer spring;
    a hydraulic lock compartment configured to lock the closer spring, and
    a solenoid valve configured as a 3/2-solenoid control valve;
    a closure damping compartment arranged between the door closer housing and the piston assembly on a side of the piston assembly facing away from the piston rod;
    a tank compartment;
    a pressure line arranged from the hydraulic lock compartment and the 3/2-solenoid control valve;
    an operating line arranged from the closure damping compartment to the 3/2-solenoid control valve;
    a tank line arranged from the a tank compartment to the 3/2-solenoid control valve; and
    a fluid-tight separating wall arranged in the door closer housing between the piston assembly and the closer spring, wherein the piston rod passes through the separating wall in a fluid-tight manner,
        wherein the solenoid valve controls at least the pressures in the closure damping compartment and in the lock compartment.

2. The door closer of claim 1, further comprising a free-swing assembly configured to enable a translational motion of the piston assembly decoupled from the closer spring when the closer spring is locked.

3. The door closer of claim 1, further comprising a closer spring tension piston guided in the door closer housing and abutting on the closer spring.

4. The door closer of claim 3, wherein the lock compartment is formed between the separating wall and the closer spring tension piston.

5. The door closer of one claim 2, wherein the free-swing assembly is a sliding-coupling that exclusively transmits compressive force between the closer spring and the piston assembly.

6. A door closer, including at least one of a locking function and a free-swing function, comprising:
    a door closer housing;
    an output shaft configured to connect to a door;
    a piston assembly connected to the output shaft and guided in the door closer housing;
    a closer spring;
    a piston rod that connects the piston assembly to the closer spring;
    a hydraulic lock compartment configured to lock the closer spring, and
    a solenoid valve configured as a 3/2-solenoid control valve;
    a closure damping compartment arranged between the door closer housing and the piston assembly on a side of the piston assembly facing away from the piston rod;

a tank compartment;
a pressure line arranged from the hydraulic lock compartment and the 3/2-solenoid control valve;
an operating line arranged from the closure damping compartment to the 3/2-solenoid control valve; and
a tank line arranged from the a tank compartment to the 3/2-solenoid control valve,
wherein:
   the solenoid valve controls at least the pressures in the closure damping compartment and in the lock compartment,
   the output shaft comprises a cam-shaped rolling contour configured as a cam disc, and
   the piston assembly comprises free-swing assembly at least one cam roller abutting on the cam-shaped rolling contour.

7. The door closer of claim 1, further comprising
an opening damping compartment arranged one of:
   between the piston assembly and the separating wall and
   between the piston assembly and an operating line additional piston, and
a first throttled connection arranged between the opening damping compartment and the tank compartment.

8. The door closer of claim 7, further comprising:
a first unthrottled connection between the opening damping compartment and the tank compartment, wherein the first throttled connection is always open and the first unthrottled connection is one of closed and open, depending on a position of the piston assembly.

9. The door closer of claim 8, further comprising at least one further throttled connection arranged between the closure damping compartment and the tank compartment.

10. The door closer of claim 1, wherein the solenoid control valve connects the pressure line to the tank line and blocks the operating line in a first switching position and connects the operating line to the tank line and blocks the pressure line in a second switching position.

11. The door closer of claim 1, wherein the solenoid control valve connects the pressure line to the operating line in a first switching position and connects the operating line to the tank line and blocks the pressure line in a second switching position.

12. The door closer of claim 2, wherein the solenoid control valve, when de-energized, releases the closer spring and enables a free-swing-mode when energized.

13. The door closer according to claim 1, wherein the door closer is a hinge door closer.

14. The door closer of claim 3, wherein the lock compartment is formed between the separating wall and the closer spring tension piston.

* * * * *